(12) United States Patent
Zhang

(10) Patent No.: US 11,037,528 B2
(45) Date of Patent: Jun. 15, 2021

(54) DISPLAY SCREEN BRIGHTNESS PROCESSING METHOD AND TERMINAL DEVICE

(71) Applicant: XI'AN ZHONGXING NEW SOFTWARE CO. LTD, Shaanxi (CN)

(72) Inventor: Xiaoliang Zhang, Shaanxi (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/630,967

(22) PCT Filed: Sep. 20, 2017

(86) PCT No.: PCT/CN2017/102507
§ 371 (c)(1),
(2) Date: Jan. 14, 2020

(87) PCT Pub. No.: WO2019/010819
PCT Pub. Date: Jan. 17, 2019

(65) Prior Publication Data
US 2020/0227005 A1 Jul. 16, 2020

(30) Foreign Application Priority Data
Jul. 14, 2017 (CN) .......................... 201710578553.9

(51) Int. Cl.
*G09G 5/10* (2006.01)
*G06F 3/01* (2006.01)

(52) U.S. Cl.
CPC ............... *G09G 5/10* (2013.01); *G06F 3/012* (2013.01); *G09G 2320/0686* (2013.01);
(Continued)

(58) Field of Classification Search
CPC ............ G09G 5/10; G09G 2320/0686; G09G 2354/00; G09G 2356/00; G09G 2360/04; G09G 2360/144; G06F 3/012
(Continued)

(56) References Cited

U.S. PATENT DOCUMENTS 9,262,984 B2 * 2/2016 Jung .................... G06K 9/3208
9,812,074 B2 * 11/2017 Phillips .................... G09G 3/36
(Continued)

FOREIGN PATENT DOCUMENTS

CN 101692326 A 4/2010
CN 102736722 A 10/2012
(Continued)

OTHER PUBLICATIONS

WIPO, International Search Report dated Nov. 16, 2017.
CN, Extended Search report and Office Action dated Sep. 11, 2020, CN Application No. 2017105785539 (dated Jan. 14, 2020).

*Primary Examiner* — Tom V Sheng

(57) ABSTRACT

The present disclosure provides a display screen brightness processing method, including: shooting a user through a camera arranged on a display screen of a terminal device; determining a position relationship between a face of the user and a corresponding display screen according to a shooting result, wherein the terminal device is provided with at least two display screens; and separately adjusting brightness of each display screen according to the position relationship.

16 Claims, 14 Drawing Sheets

(52) U.S. Cl.
CPC ..... *G09G 2354/00* (2013.01); *G09G 2356/00* (2013.01); *G09G 2360/04* (2013.01)

(58) Field of Classification Search
USPC ........................................................ 345/204
See application file for complete search history.

(56) References Cited

U.S. PATENT DOCUMENTS

| | | | |
|---|---|---|---|
| 10,320,962 B1* | 6/2019 | Chang | ..................... G06F 3/147 |
| 2009/0181719 A1* | 7/2009 | Cho | ..................... H04N 21/431 |
| | | | 455/556.1 |
| 2013/0147981 A1* | 6/2013 | Wu | ......................... G09G 3/20 |
| | | | 348/222.1 |
| 2013/0314581 A1* | 11/2013 | Kido | ................. H04N 5/23219 |
| | | | 348/333.12 |
| 2014/0139560 A1 | 5/2014 | Jung et al. | |

FOREIGN PATENT DOCUMENTS

| | | |
|---|---|---|
| CN | 103399684 A | 11/2013 |
| CN | 103823622 A | 5/2014 |
| CN | 105469775 A | 4/2016 |
| CN | 106155325 A | 11/2016 |
| CN | 106155692 A | 11/2016 |
| CN | 106453962 A | 2/2017 |
| JP | 2010130810 A | 6/2010 |
| WO | 2010061769 A1 | 6/2010 |

* cited by examiner

DISPLAY SCREEN BRIGHTNESS PROCESSING METHOD AND TERMINAL DEVICE

CROSS-REFERENCE TO RELATED APPLICATIONS

This is a National Phase Application filed under 35 U.S.C. 371 as a national stage of PCT/CN2017/102507, filed on Sep. 20, 2017, an application claiming the priority of Chinese Patent Application No. 201710578553.9, filed on Jul. 14, 2017, the contents of which are incorporated herein in their entirety by reference.

TECHNICAL FIELD

The present disclosure relates to, but is not limited to, the technical field of devices, and in particular, to a display screen brightness processing method and a terminal device.

BACKGROUND

With the development of terminal devices, smartphones have become one of the terminal devices with high user usage, display screens are important components of the terminal devices, and smartphones with dual display screens have become a new trend in the development of smartphones.

SUMMARY

The following is a summary of the subject matter that is described in detail herein. However, the summary is not intended to limit the protection scope of the claims.

Power consumption of a terminal device is increased due to configuration of two display screens.

Adjustment of display screen brightness of a terminal device with dual display screens may be achieved by judging ambient brightness through an ambient light sensor and automatically adjusting brightness of two display screens according to the ambient brightness, so that power consumption of the display screens is reduced as much as possible and working time of the terminal device is prolonged. However, with the method of adjusting the display screen brightness through the ambient brightness sensor, the brightness of only one display screen is adjusted, or the brightness of two display screens is simultaneously adjusted. It can be seen that the method of adjusting the display screen brightness through the ambient light sensor can only adjust the two display screens to the same brightness. However, when the terminal device with dual two display screens is used, the power consumption of the terminal device is large with the two display screens being kept to identical brightness.

A user can adjust the brightness of one of the display screens by sliding the screen or other manual operations, for example, adjust the display screen to be in a screen-off state, restore the display screen to be bright from the screen-off state, and adjust the brightness of the display screen. In such a way, for the terminal device with dual display screens, the brightness of the two display screens can be prevented from being kept identical all the time, but separate adjustment of the brightness of one of the display screens can be achieved only by manual operations of the user, which results in poor intelligence of display screen brightness adjustment of the terminal device.

With the above method of automatically adjusting the display screen brightness of the dual-screen terminal device, the two display screens can be only kept to have uniform brightness all the time, the brightness adjustment method is relatively fixed, and the power consumption of the terminal device is large considering that a user usually watches only one display screen over a period of time; with the above method of manually adjusting the display screen brightness, although the brightness of the two display screens can be separately adjusted, the user has to decide which display screen is to be used and adjust through preset gestures, which results in poor intelligence of brightness adjustment, and furthermore, there may be cases where the user forgets to turn off the other display screen while using only one display screen, which will also cause large power consumption of the terminal device.

The present disclosure provides a display screen brightness processing method and a terminal device, which can avoid the problems of large power consumption of the terminal device and poor intelligence of display screen brightness adjustment due to the fixed brightness adjusting method.

Embodiments of the present disclosure provide a display screen brightness processing method, including: shooting a user through a camera arranged on a display screen of a terminal device; determining a position relationship between a face of the user and a corresponding display screen according to a shooting result, wherein the terminal device is provided with at least two display screens; and separately adjusting brightness of each display screen according to the position relationship.

In an exemplary embodiment, before the step of shooting a user through a camera arranged on a display screen of a terminal device, the method further includes: determining state information of each display screen through a Hall device arranged on the terminal device, wherein the state information includes a folded state and an unfolded state; the step of determining a position relationship between a face of the user and a corresponding display screen according to a shooting result includes: when the state information is determined to be the unfolded state, determining the position relationship between the face of the user and the corresponding display screen according to the shooting result.

In an exemplary embodiment, after the step of determining state information of each display screen, the method further includes: determining whether the terminal device is in a vertical screen state or a horizontal screen state through a gravity sensor arranged on the terminal device.

In an exemplary embodiment, the shooting result includes an included angle between the user's face and a direction perpendicular to the corresponding display screen, and the step of determining a position relationship between a face of the user and a corresponding display screen according to a shooting result includes: when the terminal device is in a vertical screen state, determining, according to the included angle, whether the position relationship between the user's face and the corresponding display screen is on the left, or in the middle, or on the right; and when the terminal device is in a horizontal screen state, determining, according to the included angle, whether the position relationship between the user's face and the corresponding display screen is above, or in the middle, or below.

In an exemplary embodiment, the display screens include a first display screen and a second display screen, and the camera is disposed on the first display screen, when the terminal device is in the vertical screen state and the first display screen is located on the left side of the second display screen, or when the terminal device is in the horizontal screen state and the first display screen is located above the second display screen, the step of separately adjusting brightness of each display screen according to the position relationship includes: when the position relationship is on the left or above, and retention time of the position relationship is greater than a first time threshold, separately reducing the brightness of the first display screen and the brightness of the second display screen; when the retention time is greater than a second time threshold, adjusting the first display screen and the second display screen to be in a screen-off state; when the position relationship is in the middle, and the retention time of the position relationship is greater than the first time threshold, maintaining the brightness of the first display screen, and reducing the brightness of the second display screen; when the retention time is greater than the second time threshold, adjusting the second display screen to be in the screen-off state; and when the position relationship is on the right or below, and the retention time of the position relationship is greater than the first time threshold, maintaining the brightness of the second display screen, and reducing the brightness of the first display screen; when the retention time is greater than the second time threshold, adjusting the first display screen to be in the screen-off state.

In an exemplary embodiment, the step of separately adjusting brightness of each display screen according to the position relationship includes: when the position relationship is null and the retention time of the position relationship is greater than a third time threshold, adjusting each display screen to be in the screen-off state.

In an exemplary embodiment, the method further includes: determining which display screen is being currently used by the user according to the shooting result when the state information is determined to be the folded state; and adjusting the display screen which is not being currently used by the user to be in the screen-off state according to the display screen which is being currently used by the user.

In an exemplary embodiment, the method further includes: acquiring ambient light brightness in real time by an ambient light sensor arranged on the terminal device. The step of separately adjusting brightness of each display screen according to the position relationship includes: separately adjusting the brightness of each display screen according to the acquired ambient light brightness and the position relationship.

The embodiments of the present disclosure further provide a terminal device, including at least two display screens, at least one of which is provided with a camera, and further including: a shooting module configured to shoot a user through the camera arranged on the display screen of the terminal device; an image recognition module configured to determine a position relationship between a face of the user and a corresponding display screen according to a shooting result of the shooting module; and a brightness adjustment module configured to separately adjust brightness of each display screen according to the position relationship determined by the image recognition module.

In an exemplary embodiment, the terminal device further includes: a Hall device module configured to determine state information of each display screen before the shooting module shoots the user, the state information includes a folded state and an unfolded state, and the image recognition module is configured to: determine the position relationship between the user's face and the corresponding display screen according to the shooting result of the shooting module when the Hall device module determines that the state information is the unfolded state.

In an exemplary embodiment, the terminal device further includes: a gravity sensor module configured to determine whether the terminal device is in a vertical screen state or a horizontal screen state after the Hall device module determines the state information of each display screen.

In an exemplary embodiment, the shooting result of the shooting module includes an included angle between the user's face and a direction perpendicular to the corresponding display screen, and the image recognition module is configured to: when the gravity sensor module determines that the terminal device is in a vertical screen state, determine, according to the included angle, whether the position relationship between the user's face and the corresponding display screen is on the left, or in the middle, or on the right; and when the gravity sensor module determines that the terminal device is in a horizontal screen state, determine, according to the included angle, whether the position relationship between the user's face and the corresponding display screen is above, or in the middle, or below.

In an exemplary embodiment, the display screens include a first display screen and a second display screen, and the camera is disposed on the first display screen, when the gravity sensor module determines that the terminal device is in the vertical screen state and the first display screen is located on a left side of the second display screen, or when the gravity sensor module determines that the terminal device is in the horizontal screen state and the first display screen is located above the second display screen, the brightness adjustment module is configured to: when the image recognition module determines that the position relationship is on the left or above, and retention time of the position relationship is greater than a first time threshold, separately reduce the brightness of the first display screen and the brightness of the second display screen; when the retention time is greater than a second time threshold, adjust the first display screen and the second display screen to be in a screen-off state; when the image recognition module determines that the position relationship is in the middle, and the retention time of the position relationship is greater than the first time threshold, maintain the brightness of the first display screen, and reduce the brightness of the second display screen; when the retention time is greater than the second time threshold, adjust the second display screen to be in the screen-off state; and when the image recognition module determines that the position relationship is on the right or below, and the retention time of the position relationship is greater than the first time threshold, maintain the brightness of the second display screen, and reduce the brightness of the first display screen; when the retention time is greater than the second time threshold, adjust the first display screen to be in the screen-off state.

In an exemplary embodiment, the brightness adjustment module is further configured to adjust each display screen to be in the screen-off state when the position relationship determined by the image recognition module is null and the retention time of the position relationship is greater than a third time threshold.

In an exemplary embodiment, the terminal device further includes: a use determination module configured to determine which display screen is being currently used by the user according to the shooting result of the shooting module, when the Hall device module determines that the state information is the folded state; and the brightness adjustment module is further configured to adjust the display screen which is not being currently used by the user to be in the screen-off state according to the display screen which is being currently used by the user determined by using the determination module.

In an exemplary embodiment, the terminal device further includes: a brightness acquisition module configured to acquire ambient light brightness in real time, the brightness adjustment module is configured to: separately adjust the brightness of each display screen according to the ambient light brightness acquired by the brightness acquisition module and the position relationship determined by the image recognition module.

The embodiments of the present disclosure further provide a terminal device, including at least two display screens, a memory and a processor; wherein the memory is configured to store executable instructions; the processor is configured to execute the executable instructions stored in the memory so as to perform the following steps: shooting a user through a camera arranged on a display screen of the terminal device; determining a position relationship between a face of the user and a corresponding display screen according to a shooting result; and separately adjusting brightness of each display screen according to the position relationship.

The embodiments of the present disclosure further provide a computer-readable storage medium with computer-executable instructions stored thereon, and when a processor executes the computer-executable instructions, the following steps are performed: shooting a user through a camera arranged on a display screen of a terminal device, wherein the terminal device is provided with at least two display screens; determining a position relationship between a face of the user and a corresponding display screen according to a shooting result; and separately adjusting brightness of each display screen according to the position relationship.

The embodiments of the present disclosure further provides a computer-readable storage medium with computer-executable instructions stored thereon, and the above display screen brightness processing method is implemented when the computer-executable instructions are executed.

With the display screen brightness processing method and the terminal device provided by the embodiments of the present disclosure, the user is shot by the camera arranged on the display screen of the terminal device, the position relationship between the user's face and the corresponding display screen is determined according to a shooting result, and the brightness of each display screen is separately adjusted according to the position relationship, wherein the terminal device is provided with at least two display screens, and the determined position relationship can be used as a basis for determining which display screen is being currently used by the user, that is, each display screen of the terminal device is subject to distinctive brightness adjustment under the condition that the display screen being currently used by the user is known; with the technical solutions provided by the embodiments of the present disclosure, in the process of adjusting the brightness of the display screens, the display screen being currently used by the user is objectively reflected through the shooting result of the camera, based on which the brightness of each display screen is separately adjusted, so that the problems of large power consumption of the terminal device and poor intelligence of display screen brightness adjustment due to the fixed brightness adjusting method are avoided.

Other aspects will be apparent upon reading and understanding the accompanying drawings and detailed description.

DETAILED DESCRIPTION

Embodiments of the present disclosure are described below with reference to the accompanying drawings.

It should be noted that the steps shown in the flowcharts of the drawings may be performed in a computer system, such as a set of computer executable instructions. Moreover, although the flowcharts show a logical order of the steps, the steps illustrated or described may be performed in an order different from those described herein in some cases.

The terminal device in the following embodiments of the present disclosure may be a terminal device provided with at least two display screens, and the terminal device may be, for example, a dual-screen smartphone, a dual-screen personal digital assistant (PDA), or a dual-screen notebook computer. It should be noted that the following alternative embodiments provided below in the present disclosure may be combined with each other, and the same or similar concepts or processes may not be repeatedly described in some embodiments.

Figure 1:
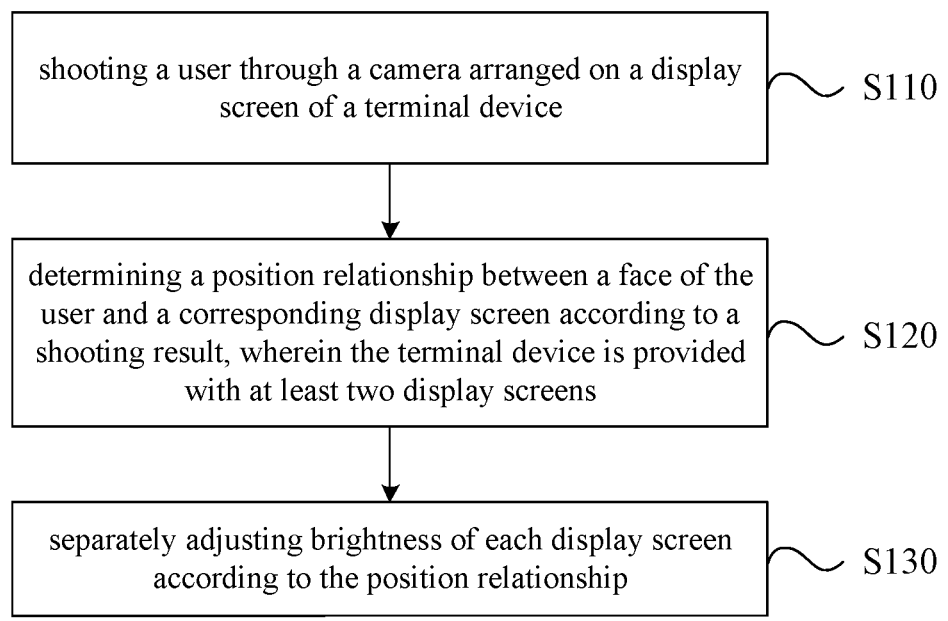
FIG. 1 is a flowchart illustrating a display screen brightness processing method according to an embodiment of the present disclosure.

FIG. 1 is a flowchart illustrating a display screen brightness processing method according to an embodiment of the present disclosure. The display screen brightness processing method according to the embodiment may be applied to brightness adjustment of a terminal device provided with at least two display screens, and the method may be performed by the terminal device implemented by a combination of hardware and software. As shown in FIG. 1, the method according to the embodiment of the present disclosure may include the following steps S110 to S130.

At step S110, a user is shot through a camera arranged on a display screen of a terminal device.

At step S120, a position relationship between a face of the user and a corresponding display screen is determined according to a shooting result, wherein the terminal device is provided with at least two display screens.

Figure 2:
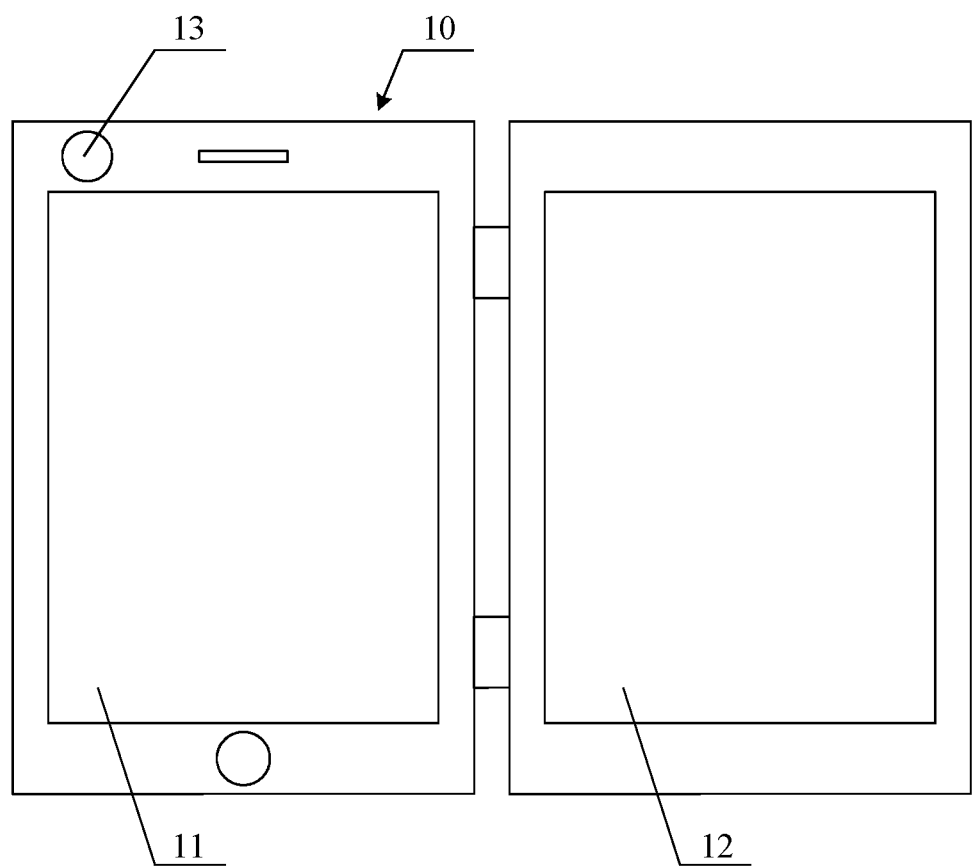
FIG. 2 is a schematic diagram of a hardware structure of a terminal device according to an embodiment of the present disclosure.

The display screen brightness processing method according to the embodiment of the present disclosure may be a method for adjusting brightness of a terminal device provided with at least two display screens. The embodiment of the present disclosure may be generally directed to a dual-screen terminal device. FIG. 2 is a schematic diagram of a hardware structure of a terminal device according to an embodiment of the present disclosure. As shown in FIG. 2, a dual-screen terminal device 10 is provided with two display screens, for example, including a first display screen 11 and a second display screen 12, and a front-facing camera may be provided on one of the display screens. The embodiment illustrated in FIG. 2 is illustrated by an example that a camera 13 is provided on the first display screen 11, and the camera 13 is disposed above a screen of the first display screen 11 (or above a screen of the second display screen 12, which is not limited by the embodiment of the present disclosure), wherein specifications of the two display screens may be completely the same or different, and types of the two display screens may also be the same or different, for example, the first display screen 11 may be a liquid crystal display (LCD), or an active-matrix organic light emitting diode (AMOLED) display, and the second display screen 12 may be of the same type as the first display screen 11, or may be an ink screen; in addition, all the display screens in the embodiments of the present disclosure may function as touch screens.

In the embodiment of the present disclosure, when a user uses the terminal device, the camera on the first display screen 11 may turn on a shooting mode, and may automatically shoot in a certain period, for example, shoot once every 1 or 2 seconds(s). Since the face of the user faces the display screen when the user uses the terminal device, the shot objects are roughly the user's facial features, such as features of a human face, features of human eyes, or features of a human face and human eyes; furthermore, contents displayed by the two display screens may be usually different, the user usually only watches the contents displayed by one display screen while using the terminal device, and the user's face usually faces the display screen which is being watched, so the shot user's face may reflect which display screen is being watched by the user, and therefore, a position relationship between the user's face and the first display screen 11 can be determined according to the shooting result, and the position relationship can reflect whether the first display screen 11 or the second display screen 12 is being watched by the user.

It should be noted that the terminal device shown in FIG. 2 is only an exemplary illustration, it is not limited by the embodiment of the present disclosure that the terminal device is only provided with a first display screen and a second display screen, but the terminal device may be provided with other display screens; it is also not limited that the front-facing camera for shooting the user's face is arranged on the first display screen, but the front-facing camera may be arranged on the second display screen or other display screen; it is also not limited that only one display screen is provided with the front-facing camera, but one or more display screens may be provided with front-facing cameras, and it is possible to shoot by one camera, or the user may choose to turn on one or more of the cameras for shooting, in a case that a plurality of cameras are turned on, position relationships between the user's face and display screens can be determined, and brightness of each display screen can be separately adjusted in consideration of a plurality of position relationships.

At step S130, brightness of each display screen is separately adjusted according to the position relationship.

In the embodiment of the present disclosure, since the position relationship between the user's face and the display screen where the camera is arranged is determined according to what is shot by the camera, it can be known which display screen is being watched by the user. On the basis of the above, the brightness of each display screen can be separately adjusted, for example, the brightness of the display screen which is currently being watched by the user is adjusted to a brightness value suitable for watching, and the display screen which is not being watched by the user is adjusted to a power-saving display mode or a screen-off mode.

In the display screen brightness processing method provided by the embodiment of the present disclosure, the user is shot by the front-facing camera arranged on the display screen, the position relationship between the user's face and a corresponding display screen is determined and is used as a basis for determining which display screen is being currently used by the user, so that the brightness of the display screen being currently used by the user and the brightness of the display screen that is not used by the user can be adjusted separately. It can be seen that, with the above method provided by the embodiment of the present disclosure, the process of adjusting the brightness of the display screens of the terminal device is completely controlled by the terminal device in an automatic way, and it is achieved that the brightness is adjusted separately according to the use of the display screens by the user, which not only facilitates reduction of the power consumption of the terminal device, but also improves the intelligence of brightness adjustment.

In the display screen brightness processing method provided by the embodiment of the present disclosure, the user is shot by the camera arranged on the display screen of the terminal device, the position relationship between the user's face and a corresponding display screen is determined according to a shooting result, and the brightness of each display screen is separately adjusted according to the position relationship, wherein the terminal device is provided with at least two display screens, and the determined position relationship can be used as a basis for determining which display screen is being currently used by the user, that is, each display screen of the terminal device is subject to distinctive brightness adjustment under the condition that the display screen being currently used by the user is known; with the method provided by the embodiment of the present disclosure, in the process of adjusting the brightness of the display screens, the display screen being currently used by the user is objectively reflected through the shooting result of the camera, based on which the brightness of each display screen is separately adjusted, so that the problems of large power consumption of the terminal device and poor intelligence of display screen brightness adjustment due to the fixed brightness adjusting method are avoided.

Figure 3:
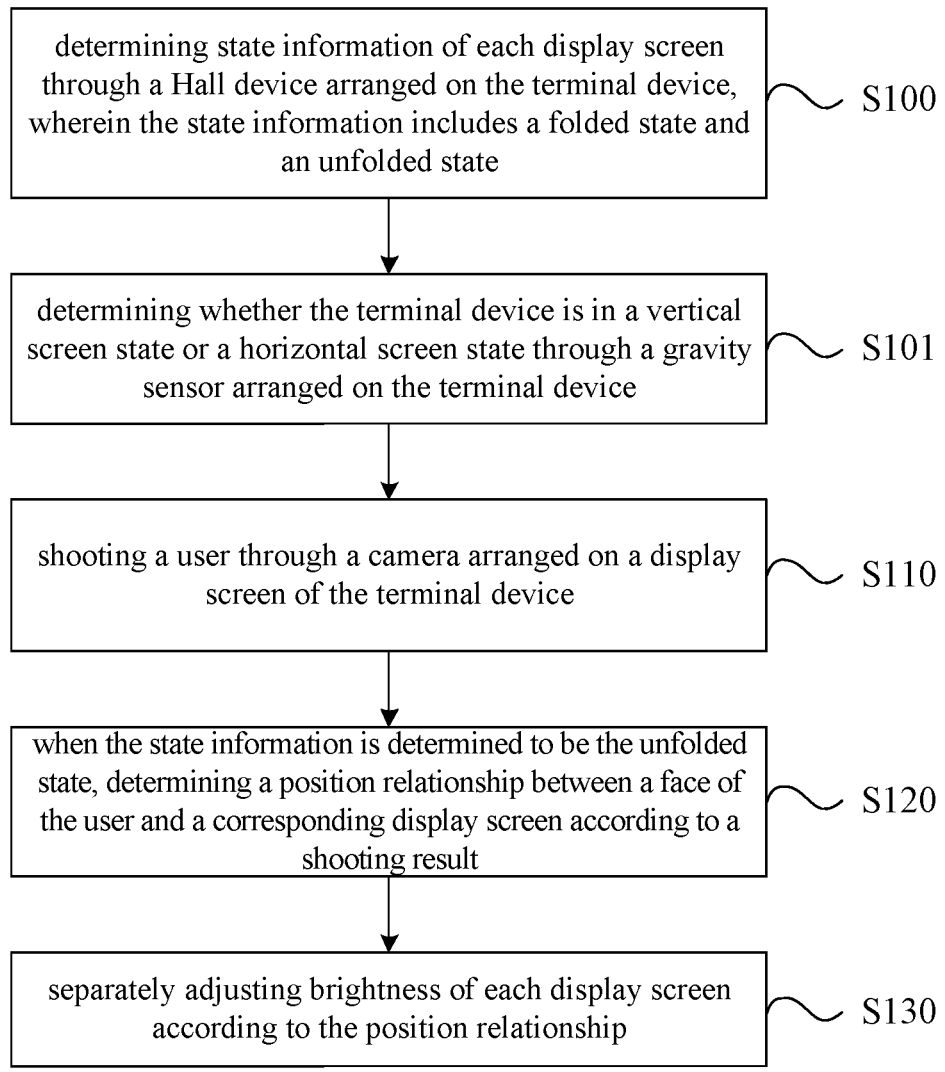
FIG. 3 is a flowchart illustrating another display screen brightness processing method according to an embodiment of the present disclosure.

Optionally, FIG. 3 is a flowchart illustrating another display screen brightness processing method according to an embodiment of the present disclosure. On the basis of the above embodiment of the present disclosure, the method provided by the embodiment of the present disclosure may further include, before step S110, the following step S100.

At step S100, state information of each display screen is determined through a Hall device arranged on the terminal device, wherein the state information includes a folded state and an unfolded state.

The implementation of step S120 in the embodiment of the present disclosure may include: when the state information is determined to be the unfolded state, determining the position relationship between the face of the user and the corresponding display screen according to the shooting result.

In the embodiment of the present disclosure, a similar example that the terminal device is provided with two display screens is given for illustration, and reference may be made to the terminal device shown in FIG. 2. After the terminal device is unfolded, the two display screens may be placed side by side, that is, a left display screen and a right display screen, which are respectively the first display screen 11 and the second display screen 12 in FIG. 2, the two display screens may be connected by a rotating shaft, and may be placed left and right (in the unfolded state) and in the folded state through rotation of the rotating shaft, and the folded state in the embodiment of the present disclosure generally indicates a back-to-back folded state (since the user cannot use the display screens if the display screens are folded face to face, a face-to-face folded state will not be considered herein). In addition, one display screen of the terminal device may be provided with a Hall device, the other display screen can be provided with a magnetic component, the state information of the above two display screens may be determined by the Hall device according to a close state and a far state of the Hall device relative to the magnetic component, that is, the two display screens are in the folded state in the case of the close state, and are in the unfolded state in the case of the far state.

In practical application, the Hall device and the magnetic component may be in the close state, the two display screens may be folded back to back, and the Hall device may output low potential voltage (low level), that is, a low potential voltage state may indicate that the two display screens of the terminal device are in the folded state; the Hall device and the magnetic component may be in the far state, the two display screens may be in the unfolded state, and the Hall device may output high potential voltage (high level), that is, a high potential voltage state may indicate that the two display screens of the terminal device are in the unfolded state.

Optionally, in the embodiment of the present disclosure, the method may further include the following step S101 after step S100.

At step S101, whether the terminal device is in a vertical screen state or a horizontal screen state is determined through a gravity sensor arranged on the terminal device.

In the embodiment of the present disclosure, the terminal device may be further provided with a gravity sensor capable of measuring a gravity direction, and a processor of the terminal device may determine whether the display screen is in the vertical screen state or the horizontal screen state according to an included angle between the gravity direction and the display screen.

Figure 4:
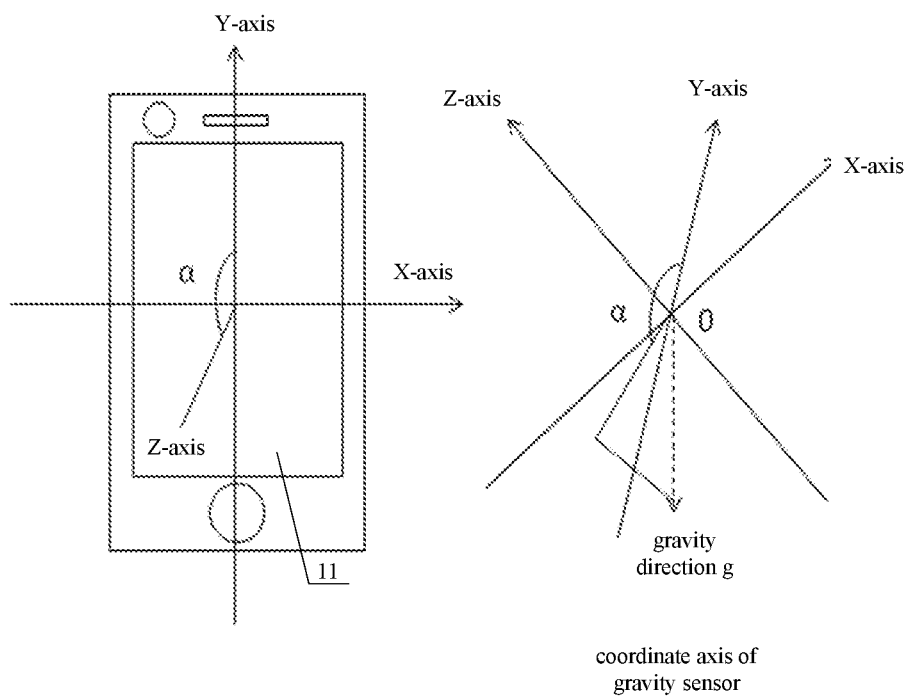
FIG. 4 is a schematic diagram illustrating a principle of determining a vertical screen state or a horizontal screen state in a display screen brightness processing method according to an embodiment of the present disclosure.

A similar example that the terminal device is provided with two display screens is given for illustration, the gravity sensor is disposed on the first display screen 11. FIG. 4 is a schematic diagram illustrating a principle of determining a vertical screen state or a horizontal screen state in the display screen brightness processing method according to an embodiment of the present disclosure. Directions of three axes x, y, and z of the gravity sensor are shown in FIG. 4: as for the first display screen 11, an X-axis direction is from left to right, a Y-axis direction is from bottom to top, and a Z-axis direction is from back to face.

As shown in FIG. 4, the gravity sensor measures an angle between a projection of the gravity direction on an XY plane and the Y axis, and it can be known from actual measurements.

(1) When the angle is in a range of 0-30 degrees or 330-360 degrees, a top of the first display screen 11 points upwards, and the terminal device is in the vertical screen state which is recorded as a first vertical screen state.

(2) When the angle is in a range of 150-210 degrees, the top of the first display screen 11 points downwards, and the terminal device is in the vertical screen state which is recorded as a second vertical screen state.

(3) When the angle is in a range of 60-120 degrees, the top of the first display screen 11 points to the left, and the terminal device is in the horizontal screen state which is recorded as a first horizontal screen state.

(4) When the angle is in a range of 240-300 degrees, the top of the first display screen 11 points to the right, and the terminal device is in the horizontal screen state which is recorded as a second horizontal screen state.

Figure 5:
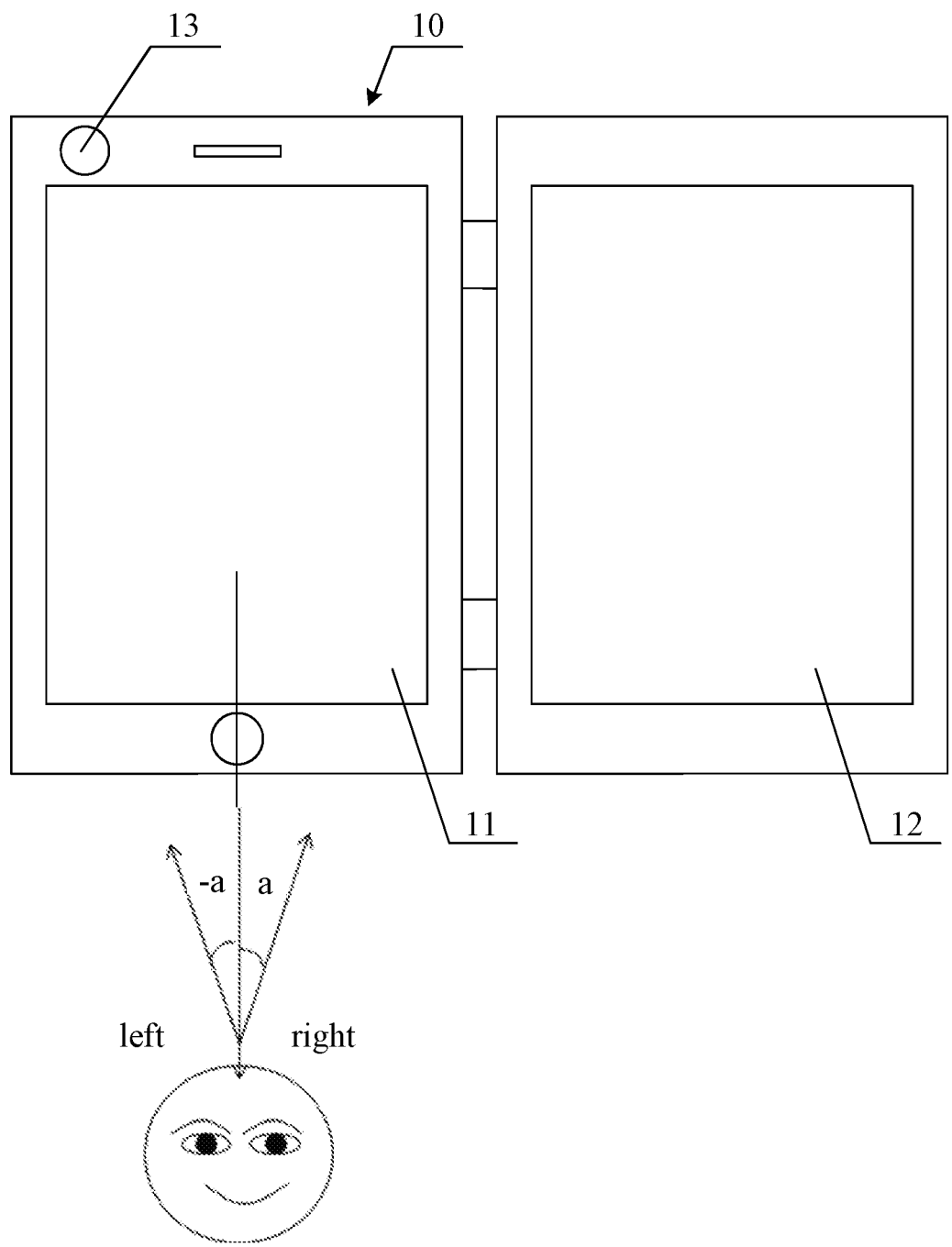
FIG. 5 is a schematic diagram of a position relationship in a display screen brightness processing method according to an embodiment of the present disclosure.

Optionally, in the embodiment of the present disclosure, the shooting result in step S120 may include an included angle a or −a between the user's face and a direction perpendicular to the display screen where the camera is arranged. As shown in FIG. 5 which is a schematic diagram of a position relationship in the display screen brightness processing method according to an embodiment of the present disclosure, the direction perpendicular to the display screen indicates a case that the user's face directly faces the display screen, and an included angle between the user's face and the direction perpendicular to the display screen is a or −a.

The implementation of step S120 in the embodiment of the present disclosure may include: when the terminal device is in the vertical screen state, determining, according to the included angle, whether the position relationship between the user's face and a corresponding display screen is on the left, or in the middle, or on the right; and when the terminal device is in the horizontal screen state, determining, according to the included angle, whether the position relationship between the user's face and the corresponding display screen is above, or in the middle, or below.

Figure 6:
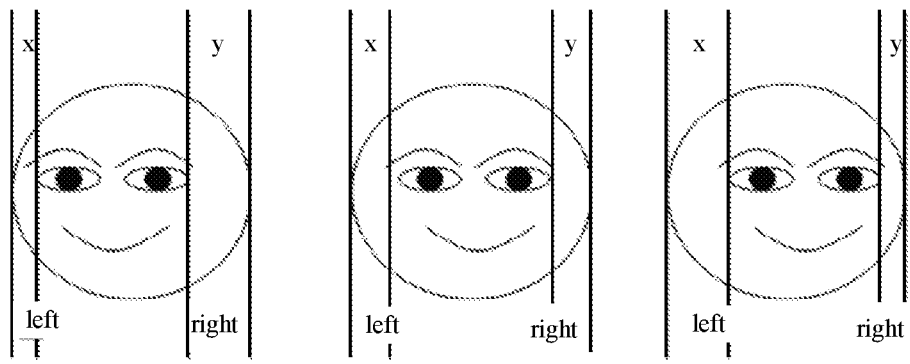
FIG. 6 is a schematic diagram illustrating a principle of determining a position relationship in a display screen brightness processing method according to an embodiment of the present disclosure.

An example that the terminal device is in the vertical screen state is given for illustration, the processor of the terminal device may identify images of a human face and human eyes from the shooting result, simultaneously extract a distance x between an outer edge of the left eye in the human face and an edge of the human face on the same side, and a distance y between an outer edge of the right eye in the human face and an edge of the human face on the same side, and define that the human face looks to the left if a value of x/y is smaller than a first threshold (e.g. 1/3), that the human face looks at the middle if the value of x/y is in a range from a second threshold (e.g. 3) to the first threshold (1/3), and that the human face looks to the right if the value of x/y is greater than the second threshold (3), and the three definitions are corresponding to the position relationships of on the left, in the middle, and on the right, respectively, as shown in FIG. 6, which is a schematic diagram illustrating a principle of determining a position relationship in the display screen brightness processing method according to an embodiment of the present disclosure.

Figure 7:
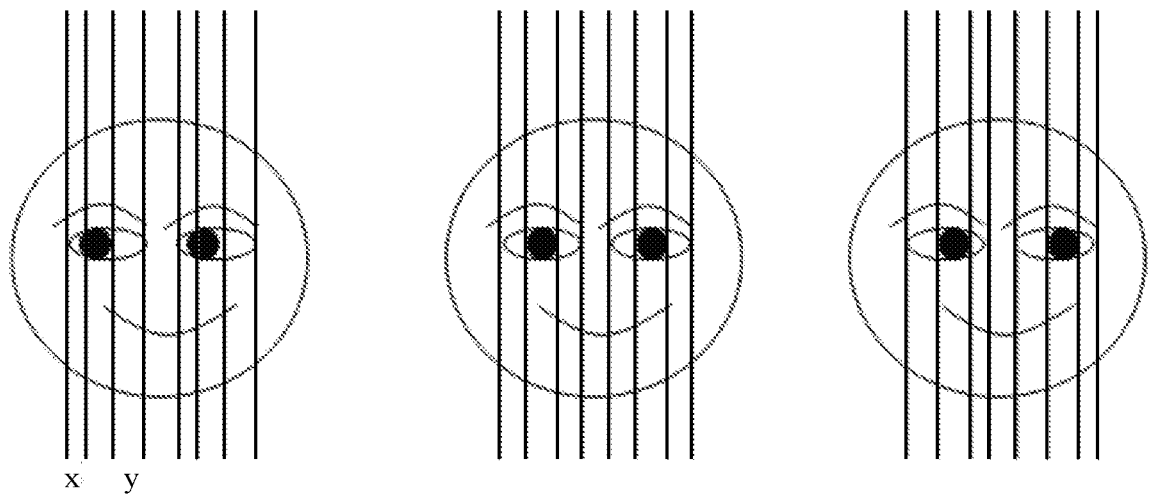
FIG. 7 is a schematic diagram illustrating another principle of determining a position relationship in a display screen brightness processing method according to an embodiment of the present disclosure.

As another example, a distance x of the whites of the eye on the left side of the pupil and a distance y of the whites of the eye on the right side of the pupil in the human eye are extracted, the human eye is defined to look to the left if a value of x/y is smaller than the first threshold (1/3), the human eye is defined to look at the middle if the value of x/y is in a range from the second threshold (e.g., 3) to the first threshold (1/3), the human eye is defined to look to the right if the value of x/y is greater than the second threshold (3), and the three definitions are corresponding to the position relationships of above, in the middle, and below, respectively, as shown in FIG. 7, which is a schematic diagram illustrating another principle of determining a position relationship in the display screen brightness processing method according to an embodiment of the present disclosure.

In practical application, in conjunction with the method of determining the horizontal screen state or the vertical screen state shown in FIG. 5, it can be known from actual measurement that an included angle a between a direction of the human face or a gaze direction of the human eyes and the direction perpendicular to the display screen is 15 degrees when x/y is equal to 3, and that an included angle −a between the direction of the human face or the gaze direction of the human eyes and the direction perpendicular to the display screen is −15 degrees when x/y is equal to 1/3; in general, two angles of the human face and the human eyes can be superimposed for consideration, and it is possible to determine according to the superimposed data whether the position relationship is on the left, in the middle, or on the right.

It should be noted that the above embodiments are illustrated by examples that the terminal device is in a vertical screen state. In cases that the terminal device is in the horizontal screen state, the principle and method of determining the position relationships are similar to those illustrated in the above embodiments, and the determined position relationships may be above, or in the middle, or below.

An embodiment is illustrated below to describe the implementation of separately adjusting the brightness of each display screen according to the position relationship, and an example that the terminal device is provided with two display screens (i.e., the first display screen and the second display screen) and the camera is disposed on the first display screen is given for illustration, when the terminal device is in the vertical screen state and the first display screen is located on a left side of the second display screen (reference may be made to the terminal device shown in FIG. 2), or when the terminal device is in the horizontal screen state and the first display screen is located above the second display screen, the implementation of step S130 in the above embodiment of the present disclosure may include: when the position relationship is on the left or above (when the user looks at a left side of the first display screen or looks above the first display screen, that is, the user looks neither of the two display screens), and retention time of the position relationship is greater than a first time threshold (e.g. 10 s), separately reducing the brightness of the first display screen and the brightness of the second display screen (for example, reducing the brightness to half of current brightness); when the retention time is greater than a second time threshold (e.g. 30 s), adjusting the first display screen and the second display screen to be in a screen-off state; when the position relationship is in the middle (when the user looks at the first display screen), and the retention time of the position relationship is greater than the first time threshold (e.g. 10 s), maintaining the brightness of the first display screen, and reducing the brightness of the second display screen (for example, reducing the brightness to half of the current brightness); when the retention time is greater than the second time threshold (e.g. 30 s), adjusting the second display screen to be in the screen-off state; and when the position relationship is on the right or below (when the user looks at the second display screen), and the retention time of the position relationship is greater than the first time threshold (e.g. 10 s), maintaining the brightness of the second display screen, and reducing the brightness of the first display screen (for example, reducing the brightness to half of the current brightness); when the retention time is greater than the second time threshold (e.g. 30 s), adjusting the first display screen to be in the screen-off state.

In the embodiment of the present disclosure, after obtaining the determined position relationship, the processor of the terminal device may perform different brightness adjustment operations on the two display screens, and a basis for the brightness adjustment operations may be the position relationship between the user's face and the display screen, that is, whether the user is watching the display screen or which display screen is being currently watched by the user.

Optionally, in the embodiment, after the brightness of the two display screens is separately adjusted, if the position relationship changes, the timing may be restarted, and the brightness of the two display screens may be separately adjusted again on the above principles under the condition that the position relationships and the time thresholds meet the requirements, Optionally, on the basis of the above embodiments of the present disclosure, the position relationship determined in the above step S120 may also be null, that is, it is determined that none of the display screens is currently being watched by the user through the shooting of the camera, and the combination of the Hall device and the gravity sensor, that is, the terminal device is in an invalid working state. Therefore, in the method provided by the embodiments of the present disclosure, the implementation of step S130 may further include: when the position relationship is null and the retention time of the position relationship is greater than a third time threshold (e.g. 30 s), adjusting each display screen to be in the screen-off state.

Figure 8:
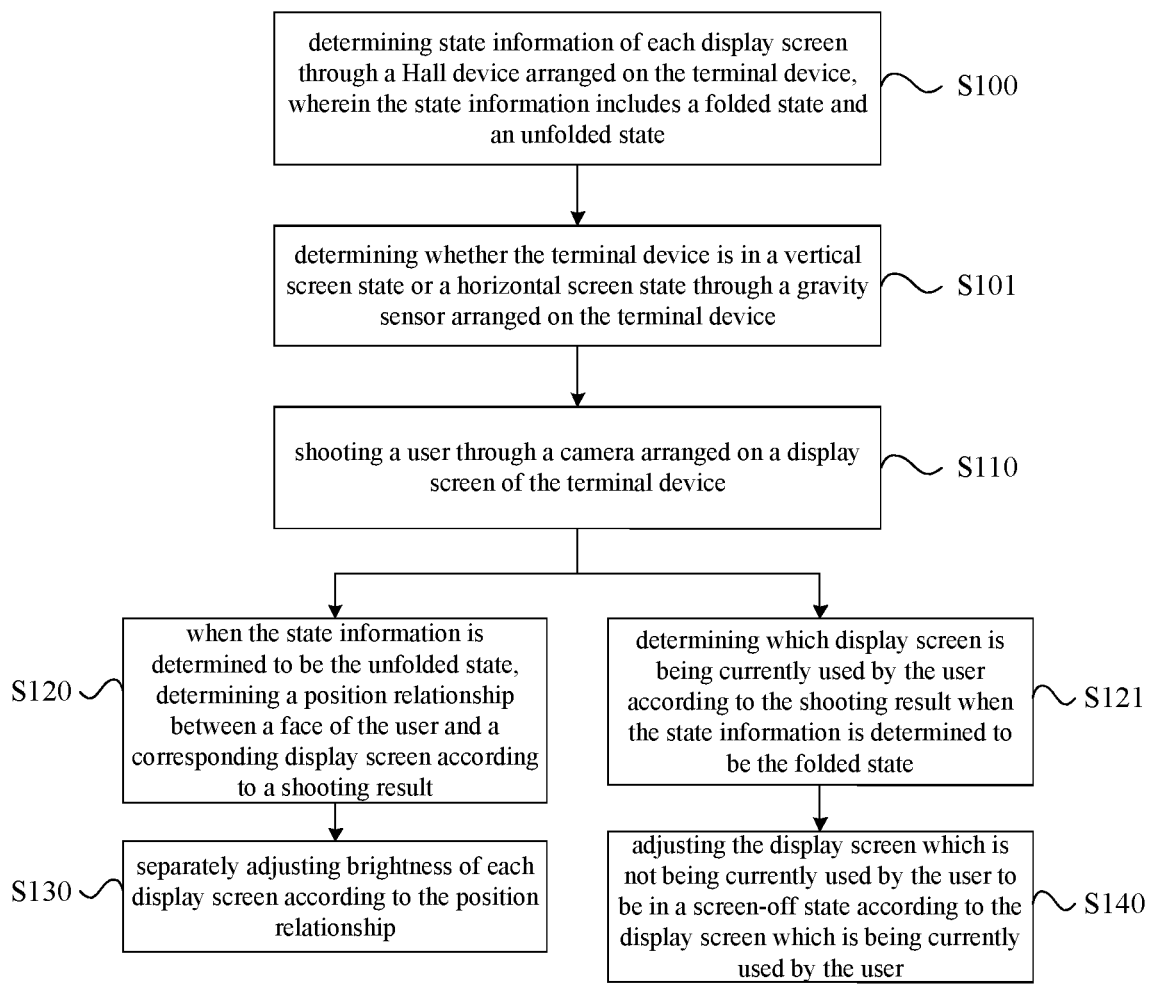
FIG. 8 is a flowchart illustrating another display screen brightness processing method according to an embodiment of the present disclosure.

It should be noted that the above embodiments describe in detail, a method of adjusting the brightness of the display screens when the terminal device is in the unfolded state, and a method of adjusting the brightness of the display screen in the folded state will be described below. FIG. 8 is a flowchart illustrating another display screen brightness processing method according to an embodiment of the present disclosure, based on the embodiment illustrated in FIG. 3, the method provided by the embodiment of the present disclosure may further include steps S121 and S140.

At step S121, which display screen is being currently used by the user is determined according to the shooting result when the state information is determined to be the folded state.

At step S140, the display screen which is not being currently used by the user is adjusted to be in the screen-off state according to the display screen which is being currently used by the user.

In the embodiment of the present disclosure, if the terminal device is in the folded state, the two display screens may be folded back to back, so that the user can face only one display screen at a time, and the other display screen is completely in an invalid working state. Therefore, after the display screen being currently used by the user is determined, the other unused display screen may be adjusted to be in the screen-off state.

Figure 9:
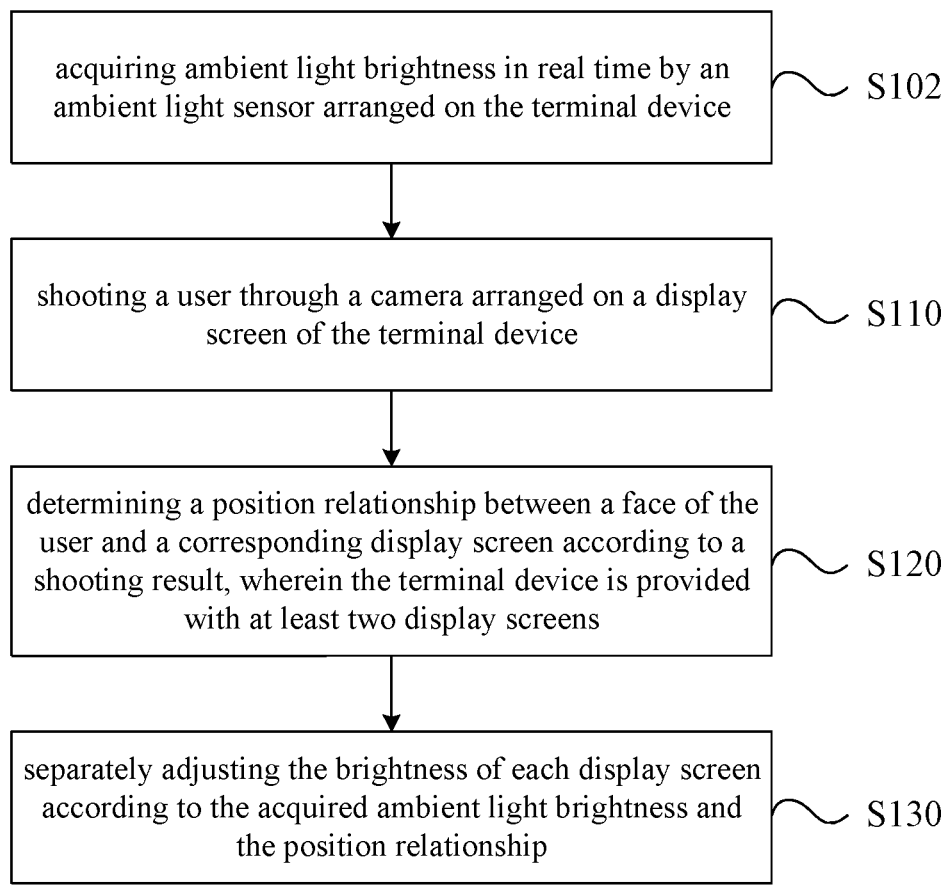
FIG. 9 is a flowchart illustrating yet another display screen brightness processing method according to an embodiment of the present disclosure.

Optionally, FIG. 9 is a flowchart illustrating yet another display screen brightness processing method according to an embodiment of the present disclosure. On the basis of the above embodiments of the present disclosure, here is shown as an example based on the embodiment illustrated in FIG. 1, the method provided by the embodiment of the present disclosure may further include step S102.

At step S102, ambient light brightness is acquired in real time by an ambient light sensor arranged on the terminal device.

It should be noted that the embodiments of the present disclosure do not limit an order of executing steps S102 and S110; in general, the ambient light sensor on the terminal device may acquire the ambient brightness in real time, and may also send a latest acquired ambient light brightness value to the processor of the terminal device in real time.

The implementation of step S130 in the embodiment of the present disclosure may include: separately adjusting the brightness of each display screen according to the acquired ambient light brightness and the position relationship.

In the embodiment of the present disclosure, the ambient light sensor may be configured to acquire ambient light brightness and send the ambient light brightness to the processor of the terminal device for processing, the ambient light brightness measured by the ambient light sensor may be divided into different levels from low to high, each level may be corresponding to a different current value of the display screen, the current values are from small to large, and a relationship between the ambient light brightness and the current value of backlight of the display screen may be represented by y=kx, where y is the current, x is the ambient light brightness, and k is a coefficient; there is also a relationship between the brightness of the display screen and the current: y'=k'x', where y' is the brightness of the display screen, x' is the current, and k' is a coefficient. Therefore, according to the actually acquired ambient light brightness, display screen brightness corresponding to different ambient light brightness can be obtained.

In the embodiment of the present disclosure, the brightness of different display screens may be adjusted by one brightness adjustment module, or each display screen may be provided with a corresponding brightness adjustment module, that is, each brightness adjustment module may store a display screen brightness table corresponding to the ambient light brightness, and adjust the brightness of each display screen according to the ambient light brightness acquired by the ambient light sensor. In practical application, the brightness adjustment modules may extract the determined position relationship, and separately adjust the brightness of each display screen according to a stored display screen brightness table corresponding to the position relationship and the display screen brightness table corresponding to the ambient light brightness.

Figure 10:
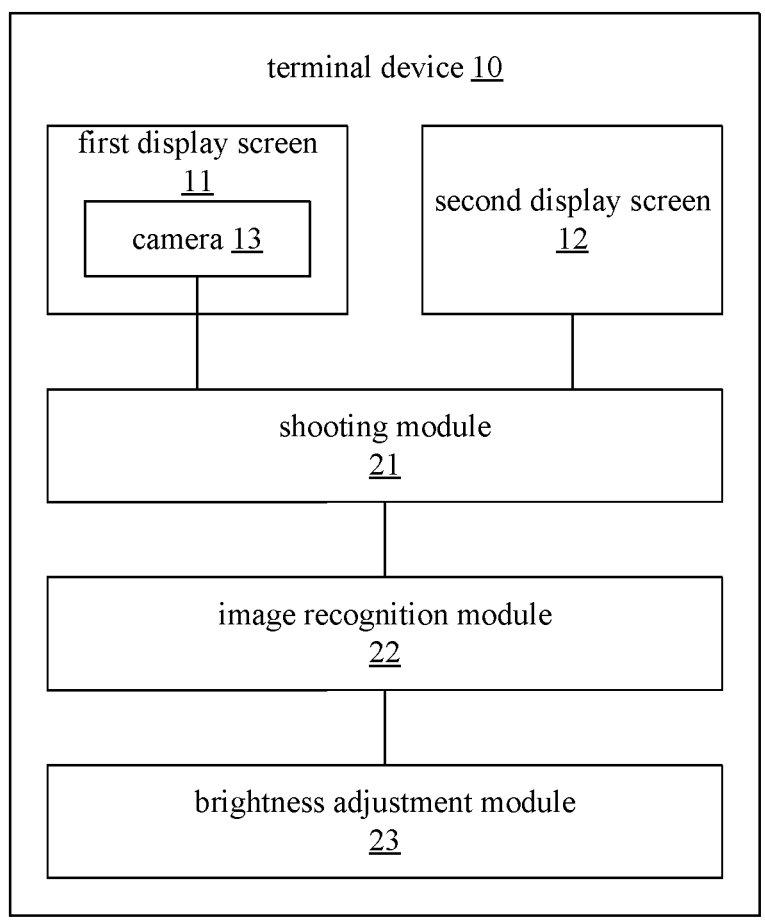
FIG. 10 is a schematic structural diagram of a terminal device according to an embodiment of the present disclosure.

FIG. 10 is a schematic structural diagram of a terminal device according to an embodiment of the present disclosure. The terminal device provided by the embodiment may be applicable in a case that brightness adjustment is performed on a terminal device provided with at least two display screens, and the terminal device may be implemented by combining hardware and software. As shown in FIG. 10, the terminal device 10 according to the embodiment may include at least two display screens, at least one of which is provided with a camera, and may further include a shooting module 21, an image recognition module 22 and a brightness adjustment module 23. The terminal device shown in FIG. 10 is also illustrated by an example that the terminal device is provided with two display screens, that is, including a first display screen 11, a second display screen 12, and a camera 13 arranged on the first display screen 11.

The shooting module 21 is configured to shoot a user through the camera 13 arranged on the display screen of the terminal device.

The image recognition module 22 is configured to determine a position relationship between a face of the user and a corresponding display screen according to a shooting result of the shooting module 21.

The terminal device provided by the embodiment of the present disclosure is configured to perform a method of adjusting brightness for the terminal device provided with at least two display screens. The embodiment of the present disclosure may be generally directed to a dual-screen terminal device, and reference may be also made to a hardware structure of the terminal device shown in FIG. 2, specifications of the two display screens in the embodiment of the present disclosure may be completely the same or different, and types of the two display screens may also be the same or different, for example, the first display screen 11 may be an LCD, or an AMOLED display, and the second display screen 12 may be of the same type as the first display screen 11, or may be an ink screen; in addition, all the display screens in the embodiments of the present disclosure may function as touch screens.

In the embodiment of the present disclosure, when a user uses the terminal device, the shooting module 12 may control the camera on the first display screen 11 to turn on a shooting mode, automatically shoot in a certain period, for example, shoot once every 1 s or 2 s, and send a shooting result to the image recognition module 22. Since it is a face of the user that faces the display screen when the user uses the terminal device, the shot objects are roughly the user's facial features, such as features of a human face, features of human eyes, or features of a human face and human eyes; furthermore, contents displayed by the two display screens may be usually different, the user usually only watches the contents displayed by one display screen while using the terminal device, and the user's face usually faces the display screen which is being watched, so the shot user's face may reflect which display screen is currently being watched by the user, and therefore, the image recognition module 22 may determine a position relationship between the user's face and the first display screen 11 according to the shooting result, and the position relationship can reflect whether the first display screen 11 or the second display screen 12 is being watched by the user.

It should be noted that the terminal devices shown in FIG. 2 and FIG. 10 are only exemplary illustrations, it is not limited by the embodiments of the present disclosure that the terminal device is only provided with a first display screen and a second display screen, but the terminal device may be provided with other display screens; it is also not limited that the front-facing camera for shooting the user's face is arranged on the first display screen, but the front-facing camera may be arranged on the second display screen or other display screen; it is also not limited that only one display screen is provided with the front-facing camera, but one or more display screens may be provided with front-facing cameras, and it is possible to shoot by one camera, or the user may choose to turn on one or more of the cameras for shooting, in a case that a plurality of cameras are turned on, position relationships between the user's face and display screens where the cameras are arranged can be determined, and brightness of each display screen can be separately adjusted in combination of a plurality of position relationships.

The brightness adjustment module 23 is configured to separately adjust brightness of each display screen according to the position relationship determined by the image recognition module 22.

In the embodiment of the present disclosure, since the position relationship between the user's face and the display screen where the camera is arranged is determined by the image recognition module 22 according to what is shot by the camera, it can be known which display screen is being watched by the user. On the basis of the above, the brightness adjustment module 23 may separately adjust the brightness of each display screen, for example, adjust the brightness of the display screen which is currently being watched by the user to a brightness value suitable for watching, and adjust the display screen which is not watched by the user to a power-saving display mode or a screen-off mode.

It should be noted that, in the embodiment of the present disclosure, it is possible to provide one brightness adjustment module 23 for all display screens, or to provide a corresponding brightness adjustment module for each display screen, so that each brightness adjustment module may perform different adjustment operations on the corresponding display screen when the position relationship sent by the image identification module 22 is acquired.

With the terminal device provided by the embodiment of the present disclosure, the user is shot by the front-facing camera arranged on the display screen, and the position relationship between the user's face and the corresponding display screen is determined, and is used as a basis for determining which display screen is being currently used by the user, so that the brightness of the display screen that is being currently used by the user and the brightness of the display screen that is not being used by the user can be adjusted separately. It can be seen that, with the terminal device provided by the embodiment of the present disclosure, the process of adjusting the brightness of the display screens of the terminal device is completely controlled by the terminal device in an automatic way, and it is achieved that the brightness is adjusted separately according to the use of the display screens by the user, which not only facilitates reduction of the power consumption of the terminal equipment, but also improves the intelligence of brightness adjustment.

The terminal device provided by the embodiment of the present disclosure may be configured to perform the display screen brightness processing method provided by the embodiment illustrated in FIG. 1 of the present disclosure, and is provided with corresponding physical devices and functional modules, and it performs on similar principles and produces similar technical effects, which will not be repeated herein.

Figure 11:
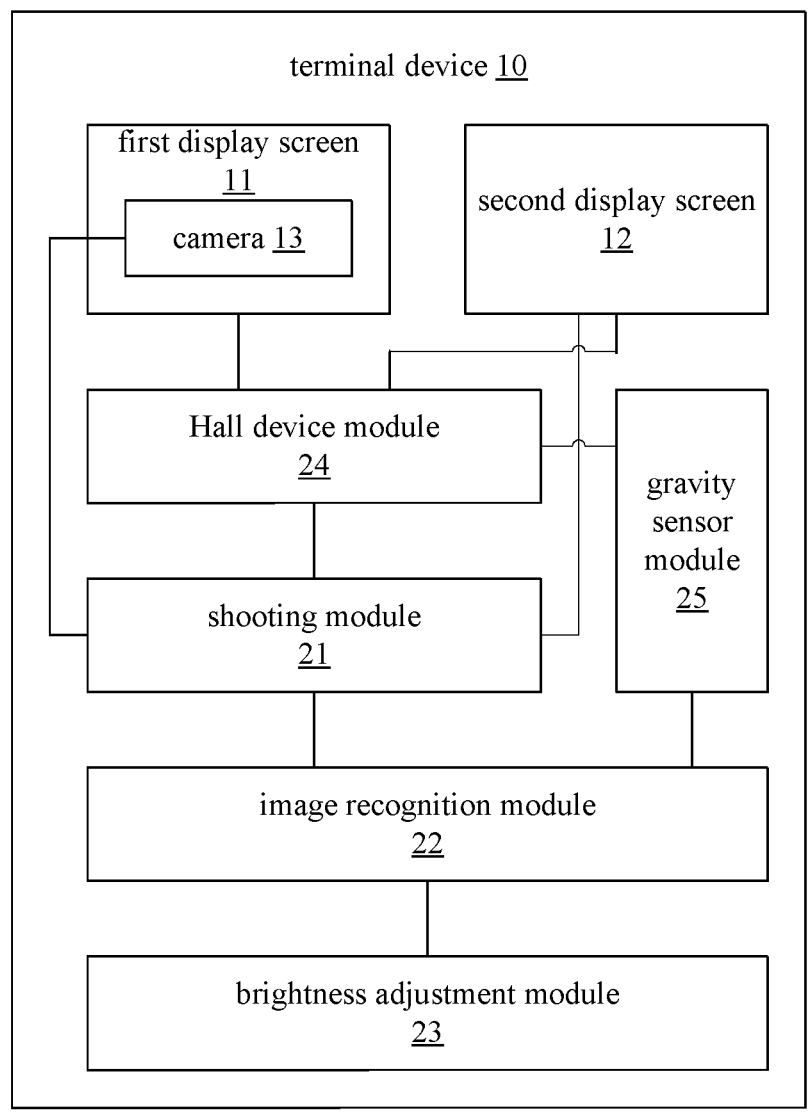
FIG. 11 is a schematic structural diagram of another terminal device according to an embodiment of the present disclosure.

Optionally, FIG. 11 is a schematic structural diagram of another terminal device according to an embodiment of the present disclosure. On the basis of the structure of the above terminal device of the present disclosure, the terminal device 10 of the embodiment of the present disclosure may further include: a Hall device module 24 configured to determine state information of each display screen before the shooting module 21 shoots the user. The state information includes a folded state and an unfolded state. The image recognition module 22 in the embodiment of the present disclosure may be configured to determine the position relationship between the user's face and the corresponding display screen according to the shooting result of the shooting module 21 when the Hall device module 24 determines that the state information is the unfolded state.

In the embodiment of the present disclosure, a similar example that the terminal device is provided with two display screens is given for illustration, and reference may be made to the structure of the terminal device shown in FIG. 2. After the terminal device is unfolded, the two display screens may be placed side by side, that is, a left display screen and a right display screen, which are respectively the first display screen 11 and the second display screen 12 in FIG. 2, the two display screens may be connected by a rotating shaft, and may be placed left and right (in the unfolded state) and in the folded state through rotation of the rotating shaft, and the folded state in the embodiment of the present disclosure generally indicates a back-to-back folded state (since the user cannot use the display screens if the display screens are folded face to face, a face-to-face folded state will not be considered herein). In addition, one display screen of the terminal device can be provided with a Hall device, the other display screen can be provided with a magnetic component, the state information of the above two display screens can be determined by the Hall device according to a close state and a far state of the Hall device relative to the magnetic component, that is, the two display screens are in the folded state in the case of the close state, and are in the unfolded state in the case of the far state.

Optionally, in the embodiment of the present disclosure, the terminal device 10 may further include: a gravity sensor module 25 configured to determine whether the terminal device is in a vertical screen state or a horizontal screen state after the Hall device module 24 determines the state information of each display screen.

In the embodiment of the present disclosure, the gravity sensor module 25 arranged on the terminal device may measure a gravity direction, and a processor of the terminal device may determine whether the display screen is in a vertical screen state or a horizontal screen state according to an included angle between the gravity direction and the display screen. Reference may be made to the schematic diagram of FIG. 4 illustrating the principle of determining a vertical screen state or a horizontal screen state. The implementation of determining a vertical screen state or a horizontal screen state has been already described in detail in the above embodiments, and thus will not be repeated herein.

Optionally, in the embodiment of the present disclosure, the shooting result of the shooting module 21 may include an included angle a or −a between the user's face and a direction perpendicular to the display screen where the camera is arranged. Referring to the position relationship shown in FIG. 5, the direction perpendicular to the display screen indicates a case that the user's face directly faces the display screen, and an included angle between the user's face and the direction perpendicular to the display screen is a or −a.

The image recognition module 22 in the embodiment of the present disclosure may be configured to: when the gravity sensor module 25 determines that the terminal device is in the vertical screen state, determine, according to the above included angle, whether the position relationship between the user's face and the corresponding display screen is on the left, or in the middle, or on the right; and when the gravity sensor module 25 determines that the terminal device is in the horizontal screen state, determine, according to the above included angle, whether the position relationship between the user's face and the corresponding display screen is above, or in the middle, or below.

It should be noted that methods of determining whether the position relationship is on the left, or in the middle, or on the right when the terminal device is in the vertical screen state and that the position relationship is above, or in the middle, or below when the terminal device is in the horizontal screen state have been illustrated in detail in the above embodiments, and reference may be made to the methods of determining the position relationship illustrated in FIGS. 6 and 7.

An embodiment is illustrated below to describe the implementation of separately adjusting the brightness of each display screen by the brightness adjustment module 23 according to the position relationship, and a similar example that the terminal device is provided with two display screens (i.e., the first display screen and the second display screen) and the camera is disposed on the first display screen is given for illustration, when the terminal device is in a vertical screen state and the first display screen is located on a left side of the second display screen (reference may be made to the terminal device shown in FIG. 2), or when the terminal device is in a horizontal screen state and the first display screen is located above the second display screen, the brightness adjustment module 23 in the above embodiment of the present disclosure may be configured to: when the image recognition module 22 determines that the position relationship is on the left or above, and retention time of the position relationship is greater than a first time threshold, separately reduce the brightness of the first display screen and the brightness of the second display screen; when the retention time is greater than a second time threshold, adjust the first display screen and the second display screen to be in a screen-off state; when the image recognition module 22 determines that the position relationship is in the middle, and the retention time of the position relationship is greater than the first time threshold, maintain the brightness of the first display screen, and reduce the brightness of the second display screen; when the retention time is greater than the second time threshold, adjust the second display screen to be in the screen-off state; and when the image recognition module 22 determines that the position relationship is on the right or below, and the retention time of the position relationship is greater than the first time threshold, maintain the brightness of the second display screen, and reduce the brightness of the first display screen; when the retention time is greater than the second time threshold, adjust the first display screen to be in the screen-off state.

In the embodiment of the present disclosure, after obtaining the determined position relationship, the brightness adjustment module 23 of the terminal device may perform different brightness adjustment operations on the two display screens, and a basis for the brightness adjustment operations may be the position relationship between the user's face and the display screen, that is, whether the user is currently watching the display screen or which display screen is being currently watched by the user.

Optionally, in the embodiment, after the brightness of the two display screens is separately adjusted, if the position relationship changes, the timing may be restarted, and the brightness adjustment module 23 may separately adjust the brightness of the two display screens on the above principles under the condition that the position relationships and the time thresholds meet the requirements.

Optionally, on the basis of the above embodiments of the present disclosure, the position relationship determined by the image recognition module 22 may also be null, that is, it is determined that none of the display screens is currently being watched by the user through shooting by the camera in combination of the Hall device and the gravity sensor, that is, the terminal device 10 is in an invalid working state. Therefore, the brightness adjustment module 23 in the embodiment of the present disclosure may be further configured to adjust each display screen to be in a screen-off state when the position relationship determined by the image recognition module 22 is null and the retention time of the position relationship is greater than a third time threshold (e.g. 30 s).

The terminal device provided by the embodiment of the present disclosure may be configured to perform the display screen brightness processing method provided by the embodiment illustrated in FIG. 3 of the present disclosure, and is provided with corresponding physical devices and functional modules, and it performs on similar principles and produces similar technical effects, which will not be repeated herein.

Figure 12:
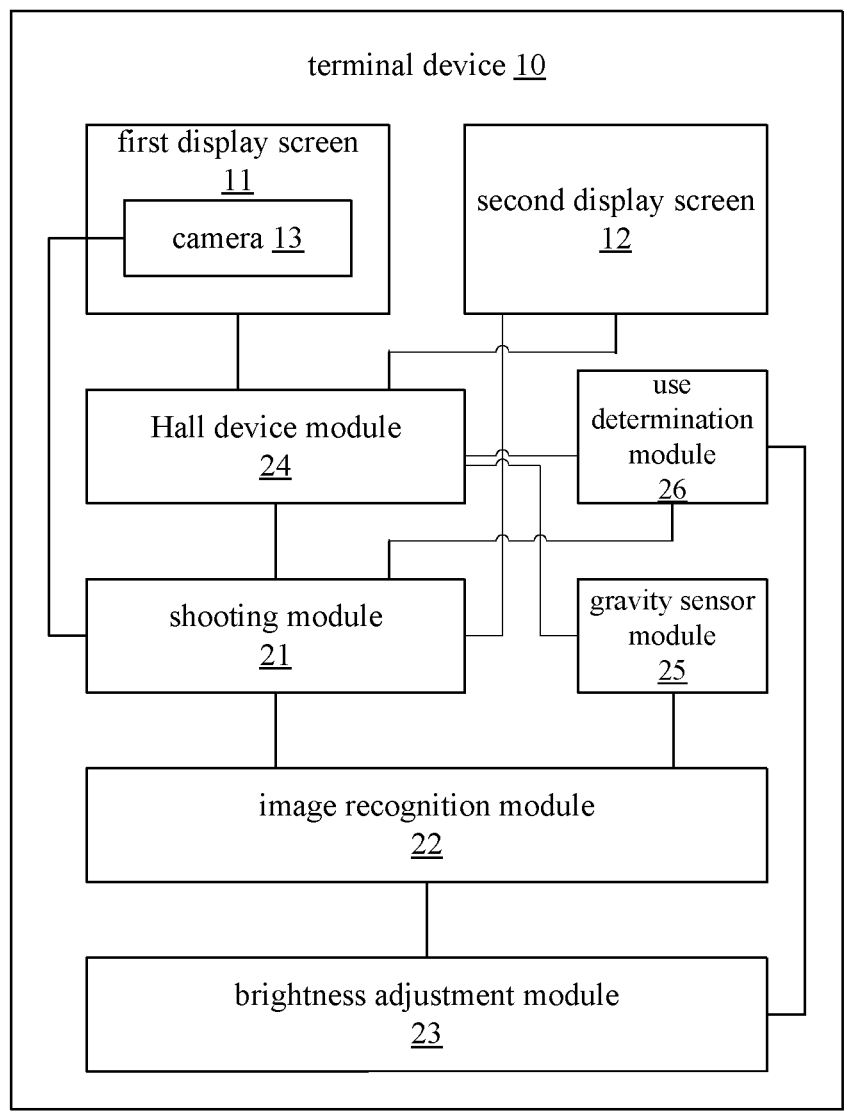
FIG. 12 is a schematic structural diagram of yet another terminal device according to an embodiment of the present disclosure.

It should be noted that the above embodiments describe in detail a method of adjusting the brightness of the display screens when the terminal device is in the unfolded state, and a method of adjusting the brightness of the display screen in the folded state will be described below. FIG. 12 is a schematic structural diagram of another terminal device according to an embodiment of the present disclosure, based on the structure of the terminal device 10 shown in FIG. 11, the terminal device 10 provided in the embodiment of the present disclosure may further include: a use determination module 26 configured to determine which display screen is being currently used by the user according to the shooting result of the shooting module 21, when the Hall device module 24 determines that the state information is the folded state; and the brightness adjustment module 23 is further configured to adjust the display screen which is not being currently used by the user to be in a screen-off state according to the display screen which is determined by the use determination module 26 to be currently used by the user.

In the embodiment of the present disclosure, if the terminal device is in the folded state, the two display screens may be folded back to back, so that the user can face only one display screen at a time, and the other display screen is completely in an invalid working state. Therefore, after the display screen being currently used by the user is determined, the other unused display screen may be adjusted to be in a screen-off state.

The terminal device provided by the embodiment of the present disclosure is configured to perform the display screen brightness processing method provided by the embodiment illustrated in FIG. 8 of the present disclosure, and is provided with corresponding physical devices and functional modules, and it performs on similar principles and produces similar technical effects, which will not be repeated herein.

Figure 13:
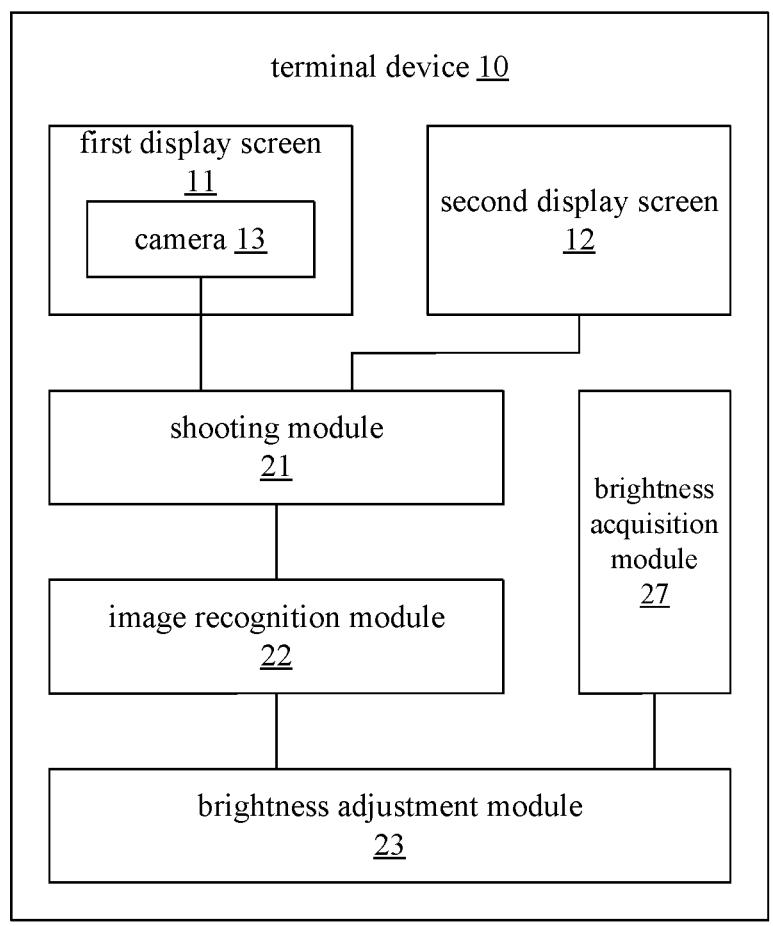
FIG. 13 is a schematic structural diagram of yet another terminal device according to an embodiment of the present disclosure.

Optionally, FIG. 13 is a schematic structural diagram of another terminal device according to an embodiment of the present disclosure. On the basis of the above embodiments of the present disclosure, here is shown as an example based on the embodiment illustrated in FIG. 10, the terminal device 10 provided by the embodiment of the present disclosure may further include: a brightness acquisition module 27 configured to acquire ambient light brightness in real time. The brightness adjustment module 23 in the embodiment of the present disclosure may be configured to separately adjust the brightness of each display screen according to the ambient light brightness acquired by the brightness acquisition module 27 and the position relationship determined by the image recognition module 22.

In the embodiment of the present disclosure, the brightness acquisition module 27 may be, for example, an ambient light sensor that is configured to acquire ambient light brightness, and send the ambient light brightness to the processor of the terminal device for processing, the ambient light brightness measured by the ambient light sensor may be divided into different levels from low to high, and the display screen brightness corresponding to different ambient light brightness may be acquired according to the actually acquired ambient light brightness.

The terminal device provided by the embodiment of the present disclosure may be configured to perform the display screen brightness processing method provided by the embodiment illustrated in FIG. 9 of the present disclosure, and is provided with corresponding physical devices and functional modules, and it performs on similar principles and produces similar technical effects, which will not be repeated herein.

In the embodiment of the present disclosure, the brightness of different display screens may be adjusted by one brightness adjustment module 23, or each display screen may be provided with a corresponding brightness adjustment module 23, that is, each brightness adjustment module 23 stores a display screen brightness table corresponding to the ambient light brightness, and adjust the brightness of each display screen according to the ambient light brightness acquired by the brightness acquisition module 27. In practical application, the brightness adjustment modules 23 may extract the determined position relationship, and separately adjust the brightness of each display screen according to a stored display screen brightness table corresponding to the position relationship and the display screen brightness table corresponding to the ambient light brightness. It should be noted that the image recognition module 22, the brightness adjustment module 23 and the use determination module 26 in the above embodiment of the present disclosure can be implemented by a processor of a terminal device.

Figure 14:
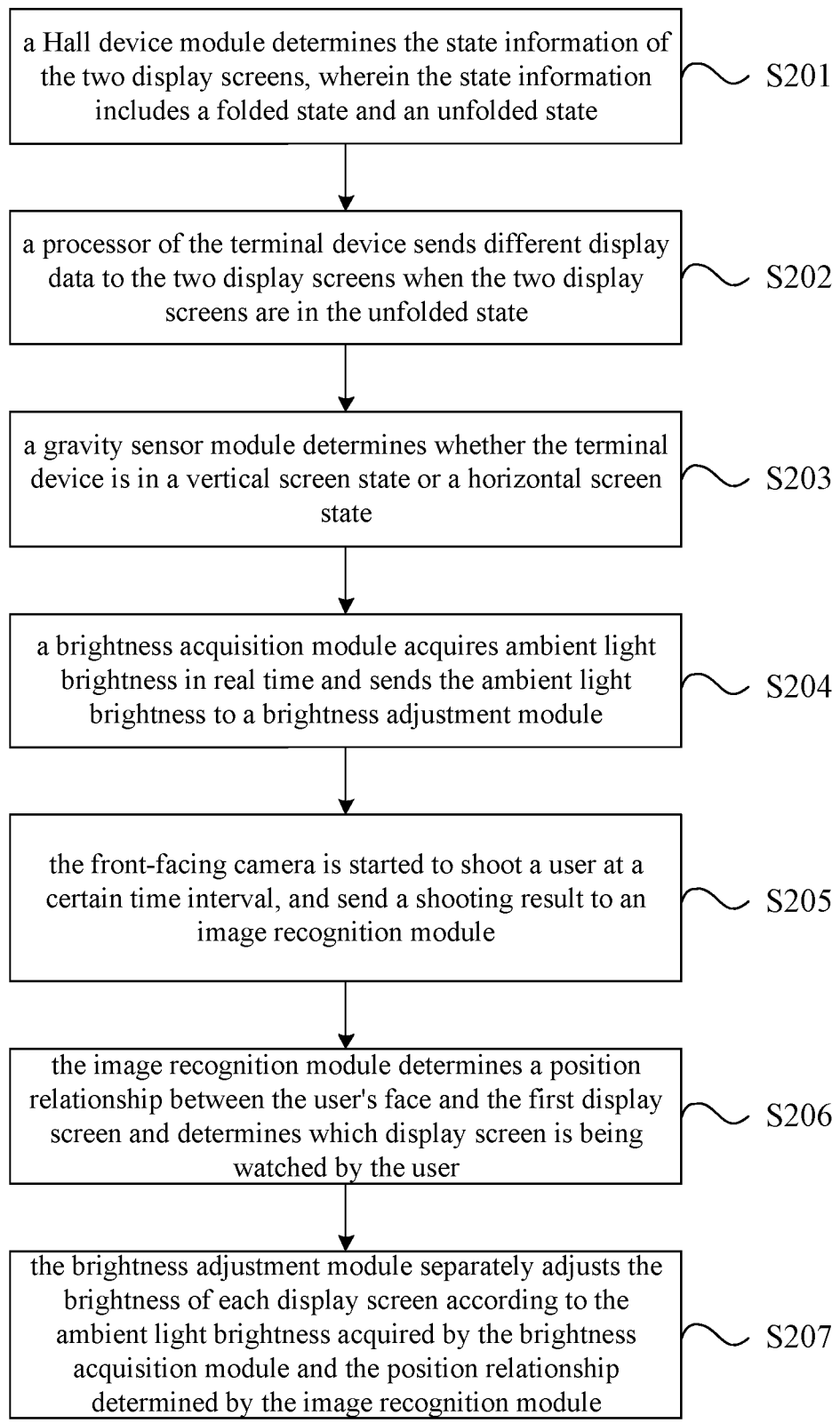
FIG. 14 is a flowchart of performing a display screen brightness processing method by a terminal device according to an embodiment of the present disclosure.

FIG. 14 is a flowchart of performing a display screen brightness processing method by a terminal device according to an embodiment of the present disclosure. The embodiment of the present disclosure is illustrated by a similar example that the terminal device is provided with two display screens, and a first display screen is provided with a front-facing camera, and the process may include the following steps S201 to S207.

At step S201, a Hall device module determines the state information of the two display screens, wherein the state information includes a folded state and an unfolded state.

At step S202, a processor of the terminal device sends different display data to the two display screens when the two display screens are in the unfolded state.

At step S203, a gravity sensor module determines whether the terminal device is in a vertical screen state or a horizontal screen state.

At step S204, a brightness acquisition module acquires ambient light brightness in real time and sends the ambient light brightness to a brightness adjustment module. It should be noted that the order of executing steps S204 and S201 to S203 is not limited by the embodiment of the present disclosure.

At step S205, the front-facing camera is started to shoot a user at a certain time interval, and send a shooting result to an image recognition module.

At step S206, the image recognition module determines a position relationship between the user's face and the first display screen and determines which display screen is being watched by the user; the methods of determining the position relationship and determining which display screen is being currently used by the user according to the position relationship have been described in the above embodiments of the present disclosure, and thus will not be repeated herein.

At step S207, the brightness adjustment module separately adjusts brightness of each display screen according to the ambient light brightness acquired by the brightness acquisition module and the position relationship determined by the image recognition module.

The application scenarios of performing the display screen brightness adjustment method by the terminal device provided by the embodiment of the present disclosure may include: Application Scenario I, when different contents are displayed on the two display screens and the human eyes look at the left display screen for a long time, the right display screen can be automatically turned into a sleep state so as to reduce the power consumption of the right display screen; Application Scenario II, when an electronic book is watched, with the left display screen being used for displaying, for example, contents of the book, and the right display screen being used, for example, for making remarks about the contents displayed on the left display screen, if the user watches the left display screen without making the remarks, and the time for watching the left display screen is longer, the right display screen can be turned into a sleep state so as to reduce the power consumption of the right display screen; Application Scenario III, when the left display screen is used for displaying videos, and the right display screen is used for displaying a chat interface, if the human eyes look at the left display screen for a long time, the right display screen can be automatically turned into a sleep state so as to reduce the power consumption of the right display screen.

Figure 15:
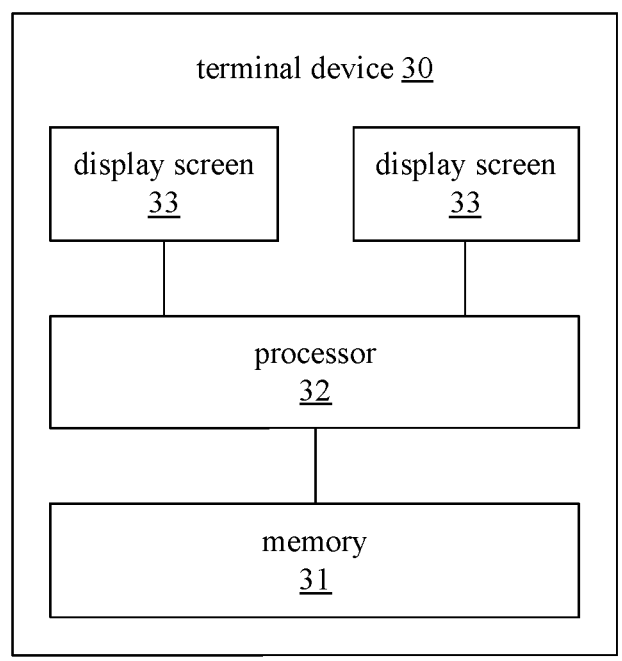
FIG. 15 is a schematic structural diagram of yet another terminal device according to an embodiment of the present disclosure.

FIG. 15 is a schematic structural diagram of another terminal device according to an embodiment of the present disclosure. The terminal device 30 provided by the embodiment of the present disclosure may include a memory 31, a processor 32, and at least two display screens 33 (the two display screens 33 are shown in FIG. 15).

The memory 31 is configured to store executable instructions, and the processor 32 is configured to execute the executable instructions stored in the memory 31 so as to perform the following steps S41 to S43.

At step S41, shooting a user through a camera arranged on a display screen of the terminal device.

At step S42, determining a position relationship between the user's face and the corresponding display screen according to a shooting result.

At step S43, separately adjusting brightness of each display screen according to the position relationship.

Optionally, in the embodiment of the present disclosure, while executing the executable instructions, the processor 32 further performs the following step S40 before executing step S41.

At step S40, determining state information of each display screen through a Hall device arranged on the terminal device, wherein the state information includes a folded state and an unfolded state.

Accordingly, when the processor 32 executes the executable instructions, the implementation of step S42 may include determining the position relationship between the user's face and the corresponding display screen according to the shooting result when the state information is determined to be the unfolded state.

Optionally, in the embodiment of the present disclosure, while executing the executable instructions, the processor 32 further performs the following step after executing step S40: determining whether the terminal device is in a vertical screen state or a horizontal screen state through a gravity sensor arranged on the terminal device.

Optionally, in the embodiment of the present disclosure, the shooting result includes an included angle between the user's face and a direction perpendicular to the corresponding display screen, and when the processor 32 executes the executable instructions, the implementation of step S42 may include steps S421 to S422.

At step S421, when the terminal device is in the vertical screen state, determining, according to the included angle, whether the position relationship between the user's face and the corresponding display screen is on the left, or in the middle, or on the right.

At step S422, when the terminal device is in a horizontal screen state, determining, according to the included angle, whether the position relationship between the user's face and the corresponding display screen is above, or in the middle, or below.

Optionally, in the embodiment of the present disclosure, the display screens include a first display screen and a second display screen, the camera is disposed on the first display screen, and when the terminal device is in the vertical screen state and the first display screen is located on a left side of the second display screen, or the terminal device is in the horizontal screen state and the first display screen is located above the second display screen, and the processor 32 executes the executable instructions, the implementation of step S43 may include steps S431 to S433.

At step S431, when the position relationship is on the left or above, and retention time of the position relationship is greater than a first time threshold, separately reducing the brightness of the first display screen and the brightness of the second display screen; when the retention time is greater than a second time threshold, adjusting the first display screen and the second display screen to be in a screen-off state.

At step S432, when the position relationship is in the middle, and the retention time of the position relationship is greater than the first time threshold, maintaining the brightness of the first display screen, and reducing the brightness of the second display screen; when the retention time is greater than the second time threshold, adjusting the second display screen to be in the screen-off state.

At step S433, when the position relationship is on the right or below, and the retention time of the position relationship is greater than the first time threshold, maintaining the brightness of the second display screen, and reducing the brightness of the first display screen; when the retention time is greater than the second time threshold, adjusting the first display screen to be in the screen-off state.

Optionally, in the embodiment of the present disclosure, when the processor 32 executes the executable instructions, the implementation of step S43 may further include: when the position relationship is null and the retention time of the position relationship is greater than a third time threshold, adjusting each display screen to be in the screen-off state.

Optionally, in the embodiment of the present disclosure, whiling executing the executable instructions, the processor 32 further performs the following steps: when the state information is determined to be the folded state, determining which display screen is being currently used by the user according to the shooting result; and adjusting the display screen which is not currently used by the user to be in a screen-off state according to the display screen which is being currently used by the user.

Optionally, in the embodiment of the present disclosure, whiling executing the executable instructions, the processor 32 further performs the following steps: acquiring ambient light brightness in real time through an ambient light sensor arranged on the terminal device.

Accordingly, when the processor 32 executes the executable instructions, the implementation of step S43 may include separately adjusting the brightness of each display screen according to the acquired ambient light brightness and the position relationship.

An embodiment of the present disclosure further provides a computer-readable storage medium with computer-executable instructions stored thereon, and when a processor executes the computer-executable instructions, the following steps S51 to S53 are performed.

At step S51, shooting a user through a camera arranged on a display screen of the terminal device, wherein the terminal device is provided with at least two display screens.

At step S52, determining a position relationship between the user's face and the corresponding display screen according to a shooting result.

At step S53, separately adjusting brightness of each display screen according to the position relationship.

Optionally, in the embodiment of the present disclosure, while executing the computer-executable instructions, the processor further performs the following step S50 before executing step S51.

At step S50, determining state information of each display screen through a Hall device arranged on the terminal device, wherein the state information includes a folded state and an unfolded state.

Accordingly, when the processor executes the computer-executable instructions, the implementation of step S52 may include determining the position relationship between the user's face and the corresponding display screen according to the shooting result when the state information is determined to be the unfolded state.

Optionally, in the embodiment of the present disclosure, while executing the computer-executable instructions, the processor further performs the following step after executing step S50: determining whether the terminal device is in a vertical screen state or a horizontal screen state through a gravity sensor arranged on the terminal device.

Optionally, in the embodiment of the present disclosure, the shooting result includes an included angle between the user's face and a direction perpendicular to the corresponding display screen, and when the processor executes the computer-executable instructions, the implementation of step S52 may include steps S521 to S522.

At step S521, when the terminal device is in the vertical screen state, determining, according to the included angle, whether the position relationship between the user's face and the corresponding display screen is on the left, or in the middle, or on the right.

At step S522, when the terminal device is in the horizontal screen state, determining, according to the included angle, whether the position relationship between the user's face and the corresponding display screen is above, or in the middle, or below.

Optionally, in the embodiment of the present disclosure, the display screens include a first display screen and a second display screen, the camera is disposed on the first display screen, and when the terminal device is in the vertical screen state and the first display screen is located on a left side of the second display screen, or when the terminal device is in the horizontal screen state and the first display screen is located above the second display screen, and the processor executes the computer-executable instructions, the implementation of step S53 may include steps S531 to S533.

At step S531, when the position relationship is on the left or above, and retention time of the position relationship is greater than a first time threshold, separately reducing the brightness of the first display screen and the brightness of the second display screen; when the retention time is greater than a second time threshold, adjusting the first display screen and the second display screen to be in a screen-off state.

At step S532, when the position relationship is in the middle, and the retention time of the position relationship is greater than the first time threshold, maintaining the brightness of the first display screen, and reducing the brightness of the second display screen; when the retention time is greater than the second time threshold, adjusting the second display screen to be in the screen-off state.

At step S533, when the position relationship is on the right or below, and the retention time of the position relationship is greater than the first time threshold, maintaining the brightness of the second display screen, and reducing the brightness of the first display screen; when the retention time is greater than the second time threshold, adjusting the first display screen to be in the screen-off state.

Optionally, in the embodiment of the present disclosure, when the processor executes the computer-executable instructions, the implementation of step S43 may further include: when the position relationship is null and the retention time of the position relationship is greater than a third time threshold, adjusting each display screen to be in the screen-off state.

Optionally, in the embodiment of the present disclosure, whiling executing the computer-executable instructions, the processor further performs the following steps: when the state information is determined to be the folded state, determining which display screen is being currently used by the user according to the shooting result; and adjusting the display screen which is not currently used by the user to be in a screen-off state according to the display screen which is being currently used by the user.

Optionally, in the embodiment of the present disclosure, whiling executing the computer-executable instructions, the processor further performs the following step: acquiring ambient light brightness in real time through an ambient light sensor arranged on the terminal device.

Accordingly, when the processor executes the computer-executable instructions, the implementation of step S53 may include separately adjusting the brightness of each display screen according to the acquired ambient light brightness and the position relationship.

An embodiment of the present disclosure further provides a computer-readable storage medium with computer-executable instructions stored thereon, and the above display screen brightness processing method is performed when the computer-executable instructions are executed.

It should be understood by those skilled in the art that all or part of the steps of the above method may be performed by instructing relevant hardware (e.g., a processor) with programs, and the programs may be stored in a computer-readable storage medium, such as a read-only memory, a magnetic disk, and an optical disc. Optionally, all or part of the steps of the above embodiments may also be implemented by use of one or more integrated circuits. Accordingly, each module/unit in the above embodiments may be implemented in the form of hardware, for example, by using an integrated circuit to implement corresponding functions, or may be implemented in the form of software functional modules, for example, by using a processor to execute programs/instructions stored in a memory so as to implement corresponding functions. The embodiments of the present disclosure are not limited to any specific combination of hardware and software.

It should be understood by those skilled in the art that the functional modules/units in all or some of the steps, the systems, and the devices in the methods disclosed above may be implemented as software, firmware, hardware, or suitable combinations thereof. If implemented as hardware, the division between functional modules/units stated above is not necessarily corresponding to the division of physical components; for example, one physical component may have a plurality of functions, or one function or step may be performed through cooperation of several physical components. Some or all of the components may be implemented as software executed by a processor, such as a digital signal processor, or by a microprocessor, or be implemented as hardware, or may be implemented as an integrated circuit, such as an application specific integrated circuit. Such software may be distributed on computer readable media, which may include computer storage media (or non-transitory media) and communication media (or transitory media). As well known by those skilled in the art, the term "computer storage media" includes volatile/nonvolatile and removable/non-removable media used in any method or technology for storing information (such as computer-readable instructions, data structures, program modules and other data). The computer storage media include, but are not limited to, Random Access Memories (RAMs), Read-Only Memories (ROMs), Electrically Erasable Programmable Read-Only Memories (EEPROMs), flash memories or other memory techniques, Compact Disc Read-Only Memories (CD-ROMs), Digital Versatile Disks (DVD) or other optical discs, magnetic cassettes, magnetic tape, magnetic disk or other magnetic storage devices, or any other media which can be used to store the desired information and can be accessed by a computer. In addition, it is well known by those skilled in the art that the communication media generally includes computer-readable instructions, data structures, program modules or other data in a modulated data signal, such as a carrier wave or other transport mechanism, and may include any information delivery media.

It should be understood by those skilled in the art that various modifications and equivalent substitutions made to the technical solutions of the present disclosure without departing from the spirit and scope of the technical solutions of the present disclosure shall be considered to fall within the scope of the claims.

INDUSTRIAL APPLICABILITY

With the display screen brightness processing method and the terminal device provided by the embodiments of the present disclosure, the user is shot by the camera arranged on the display screen of the terminal device, the position relationship between the user's face and the corresponding display screen is determined according to a shooting result, and the brightness of each display screen is separately adjusted according to the position relationship, wherein the terminal device is provided with at least two display screens, and the determined position relationship can be used as a basis for determining which display screen is being currently used by the user, that is, each display screen of the terminal device is subject to distinctive brightness adjustment under the condition that the display screen being currently used by the user is known; with the technical solutions provided by the embodiments of the present disclosure, in the process of adjusting the brightness of the display screens, the display screen being currently used by the user is objectively reflected through the shooting result of the camera, based on which the brightness of each display screen is separately adjusted, so that the problems of large power consumption of the terminal device and poor intelligence of display screen brightness adjustment due to the fixed brightness adjusting method are avoided.

What is claimed is:

1. A display screen brightness processing method, comprising:
    shooting a user through a camera arranged on a display screen of a terminal device;
    determining a position relationship between a face of the user and a corresponding display screen according to a shooting result, wherein the terminal device is provided with at least two display screens; and
    separately adjusting brightness of each display screen according to the position relationship,
    wherein,
    before the step of shooting a user through a camera arranged on a display screen of a terminal device, the method further comprises:
    determining state information of each display screen through a Hall device arranged on the terminal device, wherein the state information comprises a folded state and an unfolded state; and
    the step of determining a position relationship between a face of the user and a corresponding display screen according to a shooting result comprises:
    when the state information is determined to be the unfolded state, determining the position relationship between the face of the user and the corresponding display screen according to the shooting result.

2. The display screen brightness processing method of claim 1, wherein after the step of determining state information of each display screen, the method further comprises:
    determining whether the terminal device is in a vertical screen state or a horizontal screen state through a gravity sensor arranged on the terminal device.

3. The display screen brightness processing method of claim 2, wherein the shooting result comprises an included angle between the user's face and a direction perpendicular to the corresponding display screen, and the step of determining a position relationship between a face of the user and a corresponding display screen according to a shooting result comprises:
    when the terminal device is in a vertical screen state, determining, according to the included angle, whether the position relationship between the user's face and the corresponding display screen is on the left, or in the middle, or on the right; and
    when the terminal device is in a horizontal screen state, determining, according to the included angle, whether the position relationship between the user's face and the corresponding display screen is above, or in the middle, or below.

4. The display screen brightness processing method of claim 3, wherein the display screens comprise a first display screen and a second display screen, and the camera is disposed on the first display screen, when the terminal device is in the vertical screen state and the first display screen is located on the left side of the second display screen, or when the terminal device is in the horizontal screen state and the first display screen is located above the second display screen, the step of separately adjusting brightness of each display screen according to the position relationship comprises:
    when the position relationship is on the left or above, and retention time of the position relationship is greater than a first time threshold, separately reducing the brightness of the first display screen and the brightness of the second display screen; when the retention time is greater than a second time threshold, adjusting the first display screen and the second display screen to be in a screen-off state;
    when the position relationship is in the middle, and the retention time of the position relationship is greater than the first time threshold, maintaining the brightness of the first display screen, and reducing the brightness of the second display screen; when the retention time is greater than the second time threshold, adjusting the second display screen to be in the screen-off state; and
    when the position relationship is on the right or below, and the retention time of the position relationship is greater than the first time threshold, maintaining the brightness of the second display screen, and reducing the brightness of the first display screen; when the retention time is greater than the second time threshold, adjusting the first display screen to be in the screen-off state.

5. The display screen brightness processing method of claim 2, wherein the step of separately adjusting brightness of each display screen according to the position relationship comprises:
    when the position relationship is null and the retention time of the position relationship is greater than a third time threshold, adjusting each display screen to be in a screen-off state.

6. The display screen brightness processing method of claim 1, further comprising:
    determining which display screen is being currently used by the user according to the shooting result when the state information is determined to be the folded state; and
    adjusting the display screen which is not being currently used by the user to be in a screen-off state according to the display screen which is being currently used by the user.

7. The display screen brightness processing method of claim 1, further comprising:
    acquiring ambient light brightness in real time by an ambient light sensor arranged on the terminal device; and
    the step of separately adjusting brightness of each display screen according to the position relationship comprises:
    separately adjusting the brightness of each display screen according to the acquired ambient light brightness and the position relationship.

8. A computer-readable storage medium with computer-executable instructions stored thereon, wherein, when a processor executes the computer-executable instructions, the steps of the display screen brightness processing method of claim 1 are performed.

9. A terminal device, comprising at least two display screens, at least one of which is provided with a camera, and the terminal device further comprising:
a shooting module configured to shoot a user through the camera arranged on the display screen of the terminal device;
an image recognition module configured to determine a position relationship between a face of the user and a corresponding display screen according to a shooting result of the shooting module; and
a brightness adjustment module configured to separately adjust brightness of each display screen according to the position relationship determined by the image recognition module, the terminal device further comprising:
a Hall device module configured to determine state information of each display screen before the shooting module shoots the user, the state information comprising a folded state and an unfolded state; and
the image recognition module is configured to:
determine the position relationship between the user's face and the corresponding display screen according to the shooting result of the shooting module when the Hall device module determines that the state information is the unfolded state.

10. The terminal device of claim 9, further comprising:
a gravity sensor module configured to determine whether the terminal device is in a vertical screen state or a horizontal screen state after the Hall device module determines the state information of each display screen.

11. The terminal device of claim 10, wherein the shooting result of the shooting module comprises an included angle between the user's face and a direction perpendicular to the corresponding display screen, and the image recognition module is configured to:
when the gravity sensor module determines that the terminal device is in a vertical screen state, determine, according to the included angle, whether the position relationship between the user's face and the corresponding display screen is on the left, or in the middle, or on the right; and
when the gravity sensor module determines that the terminal device is in a horizontal screen state, determine, according to the included angle, whether the position relationship between the user's face and the corresponding display screen is above, or in the middle, or below.

12. The terminal device of claim 11, wherein the display screens comprise a first display screen and a second display screen, and the camera is disposed on the first display screen, when the gravity sensor module determines that the terminal device is in the vertical screen state and the first display screen is located on a left side of the second display screen, or when the gravity sensor module determines that the terminal device is in the horizontal screen state and the first display screen is located above the second display screen, the brightness adjustment module is configured to:
when the image recognition module determines that the position relationship is on the left or above, and retention time of the position relationship is greater than a first time threshold, separately reduce the brightness of the first display screen and the brightness of the second display screen; when the retention time is greater than a second time threshold, adjust the first display screen and the second display screen to be in a screen-off state;
when the image recognition module determines that the position relationship is in the middle, and the retention time of the position relationship is greater than the first time threshold, maintain the brightness of the first display screen, and reduce the brightness of the second display screen; when the retention time is greater than the second time threshold, adjust the second display screen to be in the screen-off state; and
when the image recognition module determines that the position relationship is on the right or below, and the retention time of the position relationship is greater than the first time threshold, maintain the brightness of the second display screen, and reduce the brightness of the first display screen; when the retention time is greater than the second time threshold, adjust the first display screen to be in the screen-off state.

13. The terminal device of claim 10, wherein the brightness adjustment module is further configured to adjust each display screen to be in a screen-off state when the position relationship determined by the image recognition module is null and the retention time of the position relationship is greater than a third time threshold.

14. The terminal device of claim 9, further comprising:
a use determination module configured to determine which display screen is being currently used by the user according to the shooting result of the shooting module, when the Hall device module determines that the state information is the folded state; and
the brightness adjustment module is further configured to adjust the display screen which is not being currently used by the user to be in a screen-off state according to the display screen which is determined by the use determination module to be currently used by the user.

15. The terminal device of claim 9, further comprising:
a brightness acquisition module configured to acquire ambient light brightness in real time;
wherein the brightness adjustment module is configured to:
separately adjust the brightness of each display screen according to the ambient light brightness acquired by the brightness acquisition module and the position relationship determined by the image recognition module.

16. A terminal device, comprising at least two display screens, a memory and a processor;
wherein the memory is configured to store executable instructions;
the processor is configured to execute the executable instructions stored in the memory so as to perform the following steps:
shooting a user through a camera arranged on a display screen of the terminal device;
determining a position relationship between a face of the user and a corresponding display screen according to a shooting result; and
separately adjusting brightness of each display screen according to the position relationship wherein, before the step of shooting a user through a camera arranged on a display screen of a terminal device, the method further comprises:
determining state information of each display screen through a Hall device arranged on the terminal device, wherein the state information comprises a folded state and an unfolded state; and the step of determining a position relationship between a face of the user and a corresponding display screen according to a shooting result comprises:

when the state information is determined to be the unfolded state, determining the position relationship between the face of the user and the corresponding display screen according to the shooting result.

\* \* \* \* \*

UNITED STATES PATENT AND TRADEMARK OFFICE
CERTIFICATE OF CORRECTION

PATENT NO. : 11,037,528 B2  
APPLICATION NO. : 16/630967  
DATED : June 15, 2021  
INVENTOR(S) : Xiaoliang Zhang Page 1 of 1

It is certified that error appears in the above-identified patent and that said Letters Patent is hereby corrected as shown below:

On the Title Page

The Left Column, Item (73), should read:
"ZTE CORPORATION, Guangdong (CN)"

The Left Column, Item (73), should read:
"XI'AN ZHONGXING NEW SOFTWARE CO. LTD., Xi'an (CN)"

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*